United States Patent
Ono

(10) Patent No.: US 10,015,420 B2
(45) Date of Patent: Jul. 3, 2018

(54) IMAGING DEVICE AND CONTROL METHOD THEREFOR

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/494,536

(22) Filed: Apr. 23, 2017

(65) Prior Publication Data

US 2017/0230594 A1    Aug. 10, 2017

Related U.S. Application Data

(63) Continuation of application No. PCT/JP2015/078036, filed on Oct. 2, 2015.

(30) Foreign Application Priority Data

Nov. 18, 2014 (JP) ................................ 2014-233224

(51) Int. Cl.
   *H04N 5/357* (2011.01)
   *H04N 5/225* (2006.01)
   *G03B 17/14* (2006.01)

(52) U.S. Cl.
   CPC .......... *H04N 5/3572* (2013.01); *G03B 17/14* (2013.01); *H04N 5/2254* (2013.01)

(58) Field of Classification Search
   CPC ..... H04N 5/3572; H04N 5/2254; G03B 17/14
   See application file for complete search history.

(56) References Cited

U.S. PATENT DOCUMENTS

| | | | |
|---|---|---|---|
| 5,867,737 A | 2/1999 | Shiokama | |
| 5,895,133 A | 4/1999 | Hirai | |

(Continued)

FOREIGN PATENT DOCUMENTS

| | | |
|---|---|---|
| DE | 19747094 | 4/1998 |
| EP | 1852741 | 11/2007 |

(Continued)

OTHER PUBLICATIONS

"International Search Report (Form PCT/ISA/210) of PCT/JP2015/078036", dated Dec. 15, 2015, with English translation thereof, pp. 1-2.

(Continued)

*Primary Examiner* — Twyler Haskins
*Assistant Examiner* — Angel L Garces-Rivera
(74) *Attorney, Agent, or Firm* — JCIPRNET

(57) ABSTRACT

The type of lens attached to the lens attaching portion is determined. In a case of the multiple-property lens being attached to the lens attaching portion, a plurality of images corresponding to the plurality of areas is generated. In a case of the typical lens being attached thereto, one image is generated from imaging signals of all pixels of the directional sensor. In the case of the multiple-property lens being attached to the lens attaching portion, performed is correction of removing, from an image generated in correspondence with one area of the plurality of areas, influence of a luminous flux passing an area other than the one area. In the case of the typical lens being attached thereto, a difference in sensitivity for each pixel of a plurality of types of pixels is corrected.

20 Claims, 23 Drawing Sheets

(56) References Cited

U.S. PATENT DOCUMENTS

| | | |
|---|---|---|
| 7,848,634 B2 | 12/2010 | Kranz et al. |
| 8,564,686 B2 | 10/2013 | Kurahashi et al. |
| 8,823,858 B2 | 9/2014 | Ono |
| 9,197,827 B2 | 11/2015 | Ono |
| 2015/0009369 A1 | 1/2015 | Ono |
| 2015/0109482 A1* | 4/2015 | Laroia .................... G02B 13/02 348/239 |

FOREIGN PATENT DOCUMENTS

| | | |
|---|---|---|
| EP | 2750374 | 7/2014 |
| JP | 5243666 | 7/2013 |
| JP | 2014176056 | 9/2014 |
| WO | 2013146506 | 10/2013 |

OTHER PUBLICATIONS

"Search Report of Europe Counterpart Application", dated Sep. 20, 2017, p. 1-p. 8, in which the listed references were cited.

"Written Opinion of the International Searching Authority (Form PCT/ISA/237)" of PCT/JP2015/078036, dated Dec. 15, 2015, with English translation thereof, pp. 1-8.

\* cited by examiner

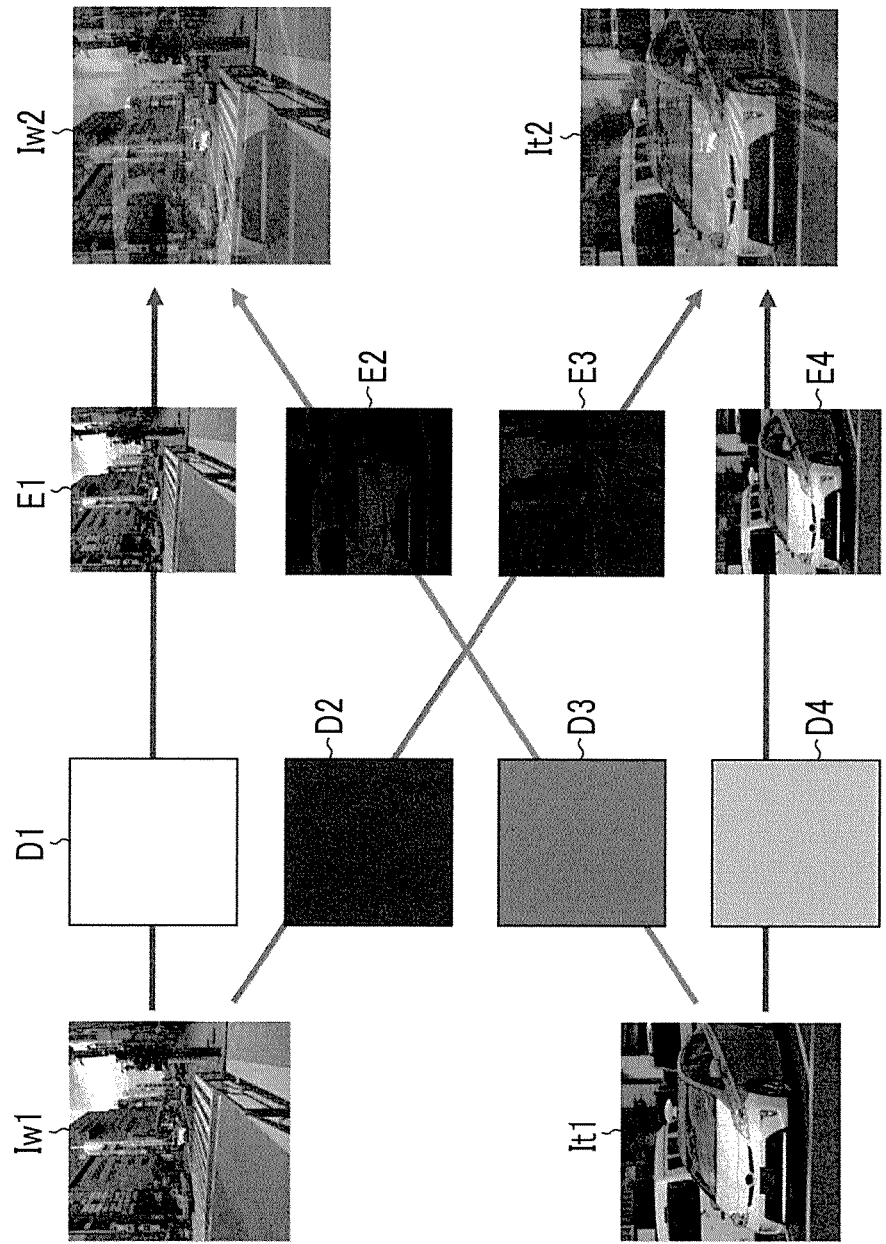

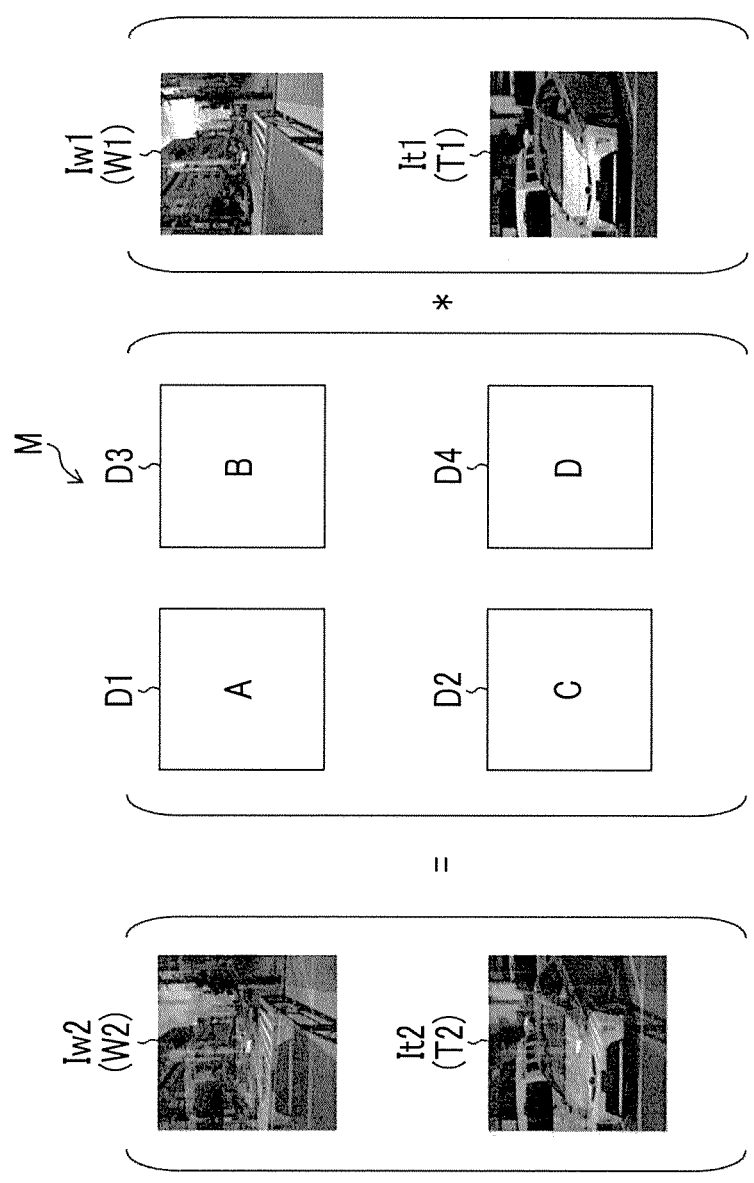

FIG. 15

$$\begin{pmatrix} W1 \\ T1 \end{pmatrix} = \begin{pmatrix} A & B \\ C & D \end{pmatrix}^{-1} \overset{M^{-1}}{\ast} \begin{pmatrix} W2 \\ T2 \end{pmatrix}$$

FIG. 16

$$W1 = \begin{pmatrix} w1\_11 & w1\_12 & w1\_13 & & \\ w1\_21 & w1\_22 & & & \\ w1\_31 & & \ddots & & \\ & & & & w1\_mn \end{pmatrix}$$

FIG. 17

$$w1\_ij = \frac{dij \cdot w2\_ij - bij \cdot t2\_ij}{aij \cdot dij - bij \cdot cij}$$

FIG. 18

$$t1\_ij = \frac{-cij \cdot w2\_ij + aij \cdot t2\_ij}{aij \cdot dij - bij \cdot cij}$$

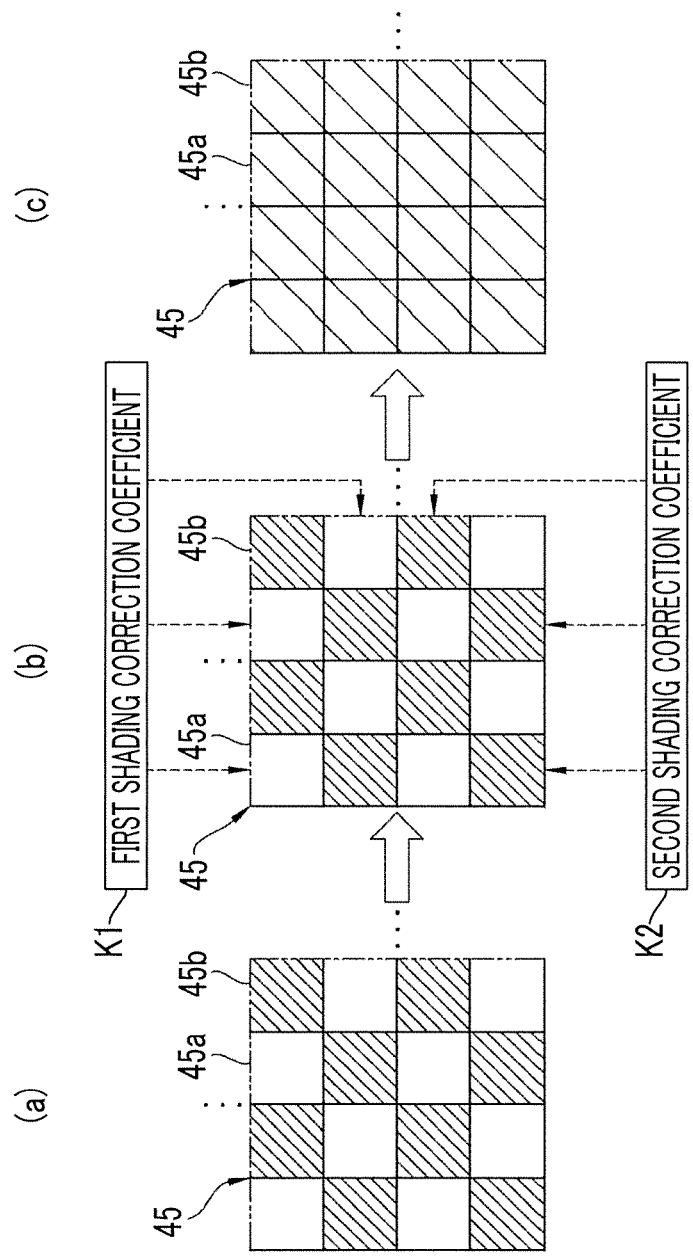

IMAGING DEVICE AND CONTROL METHOD THEREFOR

CROSS-REFERENCE TO RELATED APPLICATIONS

This application is a Continuation of PCT International Application No. PCT/JP2015/078036 filed on Oct. 2, 2015, which claims priority under 35 U.S.C § 119(a) to Patent Application No. 2014-233224 filed in Japan on Nov. 18, 2014, all of which are hereby expressly incorporated by reference into the present application.

BACKGROUND OF THE INVENTION

1. Field of the Invention

The present invention relates to an interchangeable lens imaging device including a directional sensor and a control method therefor.

2. Description of the Related Art

In the field of technology of imaging devices, known is a technology of acquiring a plurality of types of images by performing imaging with use of a lens having a plurality of properties or by performing imaging along with interchanging a plurality of types of lenses.

For example, in JP2014-176056A, disclosed is an imaging device that acquires a telescopic image and a wide-angle image at the same time with one directional sensor by combining a multiple-property lens configured of a central optical system (telescopic lens) and an annular optical system (wide-angle lens) with a directional sensor including a plurality of types of pixels and selectively receiving light by pupil division of each luminous flux incident through the central optical system and the annular optical system.

In WO2013/146506A, disclosed is an imaging device that can improve the image quality of an image captured by using the multiple-property lens disclosed in JP2014-176056A. In this imaging device, the multiple-property lens is combined with a directional sensor to acquire a plurality of captured images having at least one of a focal length and a focal distance different from one another, by using pupil division. According to the imaging device, for example, from an image generated in correspondence with one of the central optical system and the annular optical system of the multiple-property lens, influence of a luminous flux that passes the other is removed. Thus, degradation of image quality due to luminous fluxes mixed between images is prevented.

In JP5243666B, disclosed is an imaging device that outputs viewpoint images of two viewpoints having parallax by using a directional sensor including a plurality of types of pixels and selectively receiving light by pupil division of each luminous flux incident through different areas of a lens. The imaging device disclosed in JP5243666B can have a plurality of types of lenses attached thereto and acquires identification information from a lens attached to the imaging device main body to perform shading correction (sensitivity correction) of viewpoint images of two viewpoints having different sensitivity in accordance with correction data determined for each lens.

SUMMARY OF THE INVENTION

The imaging devices disclosed in JP2014-176056A and in WO2013/146506A have a problem that only an image having a smaller number of pixels than the number of pixels of the directional sensor, that is, an image corresponding to the number of pixels receiving a luminous flux passing any one of the central optical system and the annular optical system, is acquired in the case of performing imaging with a typical lens attached instead of the multiple-property lens. In addition, in the case of generating one image by reading out an imaging signal from all pixels of the directional sensor, a difference in sensitivity exists between a pixel receiving a luminous flux passing the central optical system and a pixel receiving a luminous flux passing a telescopic optical system, thereby posing a problem of degradation of image quality.

The imaging device disclosed in JP5243666B does not consider imaging with use of the multiple-property lens instead of a typical lens and also does not consider improving the image quality of an image captured by using a multiple-property lens such as that disclosed in WO2013/146506A. Thus, the imaging device disclosed in JP5243666B may have image quality degraded due to luminous fluxes mixed between images respectively corresponding to the central optical system and the annular optical system in the case of performing imaging with the multiple-property lens attached instead of a typical lens.

The present invention is conceived in view of such matters, and an object thereof is to provide an imaging device and a control method therefor that acquire an image of favorable image quality for both of a multiple-property lens and a typical lens along with use of a directional sensor.

An imaging device for achieving the object of the present invention comprises a lens attaching portion to which a plurality of types of lenses including a multiple-property lens having a plurality of areas with each of the plurality of areas having an independent property and a typical lens having one property is selectively attached, a directional sensor that has a plurality of types of pixels configured of two-dimensionally arranged photoelectric conversion elements and, in a case of the multiple-property lens being attached to the lens attaching portion, selectively receives each luminous flux incident through the plurality of areas at the plurality of types of pixels by pupil division of the luminous flux, a determining unit that determines the type of lens attached to the lens attaching portion, an image generating unit that generates an image by reading out an imaging signal for each pixel from the directional sensor, and an image correcting unit that corrects the image generated in the image generating unit, in which the image generating unit, on the basis of a determination result of the determining unit, in the case of the multiple-property lens being attached to the lens attaching portion, generates a plurality of images respectively corresponding to the plurality of areas from imaging signals of the directional sensors respectively corresponding to the plurality of areas and, in a case of the typical lens being attached to the lens attaching portion, generates one image from imaging signals of all pixels of the directional sensor, and the image correcting unit, on the basis of the determination result of the determining unit, in the case of the multiple-property lens being attached to the lens attaching portion, performs correction of removing, from an image generated in correspondence with one area of the plurality of areas, influence of a luminous flux passing an area other than the one area and, in the case of the typical lens being attached to the lens attaching portion, corrects a difference in sensitivity for each pixel of the plurality of types of pixels.

According to the imaging device of the present invention, the type of lens attached to the lens attaching portion can be determined, and the type of image correction processing performed for image data can be switched according to the determined type of lens (the multiple-property lens and the typical lens).

In the imaging device according to another embodiment of the present invention, the property is at least one of a focal length or a focal distance. Accordingly, a plurality of images having at least one of a focal length and a focal distance different from one another can be acquired at the same time with one directional sensor.

In the imaging device according to another embodiment of the present invention, a plurality of types of the multiple-property lenses is selectively attached to the lens attaching portion. Accordingly, a plurality of images can be acquired for each type of multiple-property lens.

In the imaging device according to another embodiment of the present invention, the image generating unit, on the basis of the determination result of the determining unit, reads out the imaging signal from the directional sensor in a reading format determined in advance for each type of lens. Accordingly, the imaging signal in the reading format corresponding to the type of lens attached to the lens attaching portion can be read out from the directional sensor.

The imaging device according to another embodiment of the present invention further comprises a recording unit that, on the basis of the determination result of the determining unit, records the image corrected in the image correcting unit in a recording medium in a recording format determined in advance for each type of lens. Accordingly, the image in the recording format corresponding to the type of lens attached to the lens attaching portion can be recorded in the recording medium.

The imaging device according to another embodiment of the present invention further comprises a display unit that, on the basis of the determination result of the determining unit, displays the image corrected in the image correcting unit in a display format determined in advance for each type of lens. Accordingly, the image in the display format corresponding to the type of lens attached to the lens attaching portion can be displayed on the display unit.

The imaging device according to another embodiment of the present invention further comprises a transferring unit that transfers the image corrected in the image correcting unit to a receiving unit receiving the image and, on the basis of the determination result of the determining unit, transfers the image to the receiving unit in a form of transfer determined in advance for each type of lens. Accordingly, the image in the form of transfer corresponding to the type of lens attached to the lens attaching portion can be transferred to the receiving unit.

In the imaging device according to another embodiment of the present invention, the plurality of areas has a first area and a second area that is disposed around the first area and has the same optical axis as the first area.

The imaging device according to another embodiment of the present invention further comprises an input unit that receives an input of the type of lens attached to the lens attaching portion, and the determining unit determines the type of lens attached to the lens attaching portion on the basis of an input result to the input unit. Accordingly, the type of lens can be determined by a manual operation.

A control method for an imaging device for achieving the object of the present invention is a control method for an imaging device including a lens attaching portion to which a plurality of types of lenses is selectively attached and including a directional sensor having a plurality of types of pixels configured of two-dimensionally arranged photoelectric conversion elements, the imaging device including a multiple-property lens having a plurality of areas with each of the plurality of areas having an independent property and a typical lens having one property as the plurality of types of lenses and, in a case of the multiple-property lens being attached to the lens attaching portion, selectively receiving, with the directional sensor, each luminous flux incident through the plurality of areas at the plurality of types of pixels by pupil division of the luminous flux, the method comprising a determination step of determining the type of lens attached to the lens attaching portion, an image generation step of generating an image by reading out an imaging signal for each pixel from the directional sensor, and an image correction step of correcting the image generated in the image generation step, in which the image generation step, on the basis of a determination result of the determination step, in the case of the multiple-property lens being attached to the lens attaching portion, generates a plurality of images respectively corresponding to the plurality of areas from imaging signals of the directional sensor respectively corresponding to the plurality of areas and, in a case of the typical lens being attached to the lens attaching portion, generates one image from imaging signals of all pixels of the directional sensor, and the image correction step, on the basis of the determination result of the determination step, in the case of the multiple-property lens being attached to the lens attaching portion, performs correction of removing, from an image generated in correspondence with one area of the plurality of areas, influence of a luminous flux passing an area other than the one area and, in the case of the typical lens being attached to the lens attaching portion, corrects a difference in sensitivity for each pixel of the plurality of types of pixels.

The imaging device and the control method therefor of the present invention acquire an image of favorable image quality for both of a multiple-property lens and a typical lens along with use of a directional sensor.

BRIEF DESCRIPTION OF THE DRAWINGS

FIG. 12 is a conceptual diagram for describing a mechanism of interference of the wide-angle image light and the telescopic image light between the first optical system and the second optical system.

FIG. 13 is a diagram illustrating a relationship among a true wide-angle image Iw1, a true telescopic image It1, an output wide-angle image Iw2, an output telescopic image It2, and a matrix M configured of a detected gain distribution and a crosstalk gain distribution.

FIG. 15 is a diagram illustrating a determinant that is represented by simplifying the determinant in FIG. 14.

FIG. 16 is a diagram illustrating elements w1_11 to w1_mn constituting "W1" illustrated in FIG. 15.

FIG. 17 is a diagram illustrating a calculation formula of "w1_ij" derived on the basis of the determinant illustrated in FIG. 15.

FIG. 18 is a diagram illustrating a calculation formula of "t1_ij" derived on the basis of the determinant illustrated in FIG. 15.

(a) to (c) of FIG. 21 are descriptive diagrams for describing shading correction processing for a single image signal processing section.

Figure 22A:
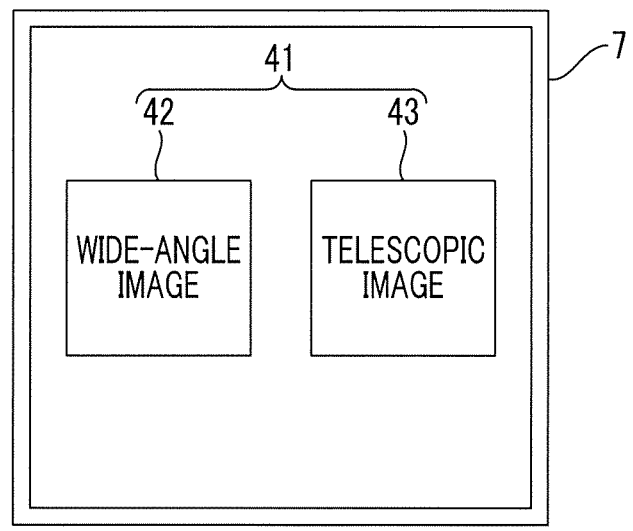
Figure 22B:
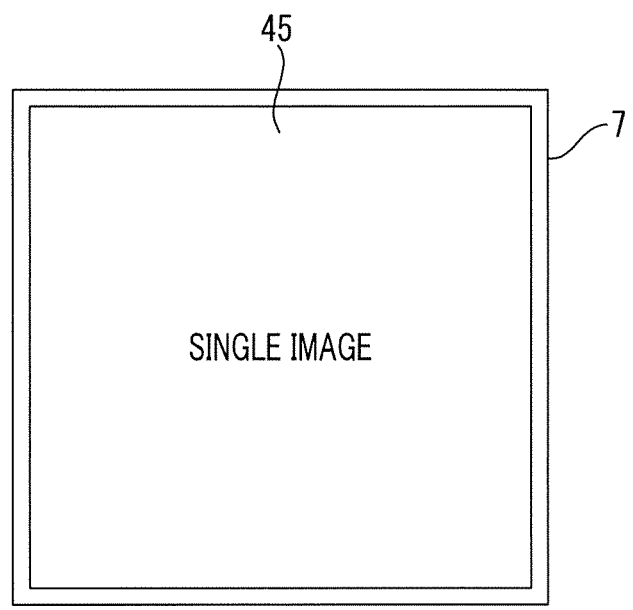

FIG. 22A is a descriptive diagram for describing the display format of an image of a display unit in the case of the multiple-property lens being attached to the lens attaching portion, and FIG. 22B is a descriptive diagram for describing the display format of an image of the display unit in the case of the typical lens being attached to the lens attaching portion.

Figure 23:
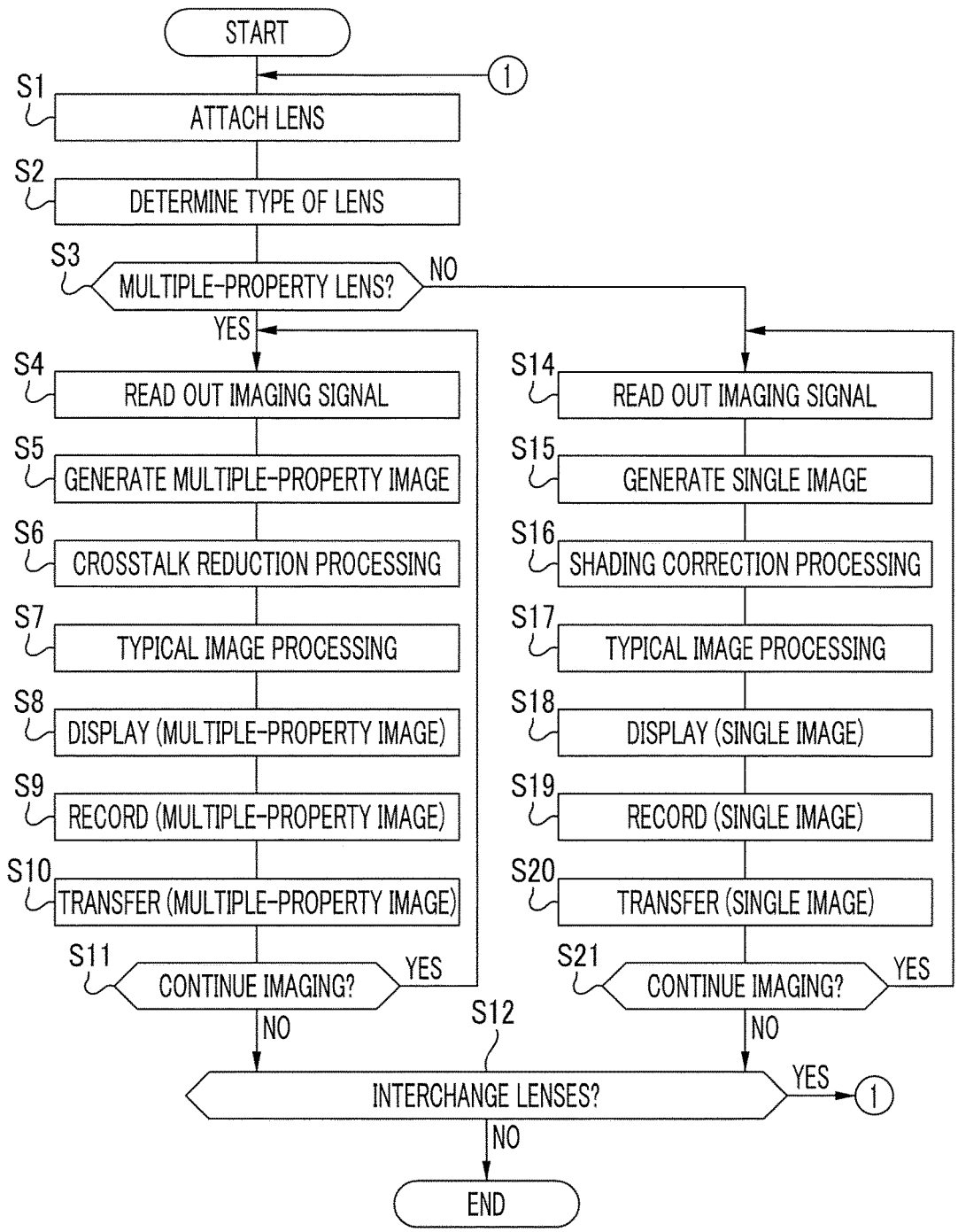

FIG. 23 is a flowchart illustrating the flow of imaging processing of the imaging device.

Figure 24:
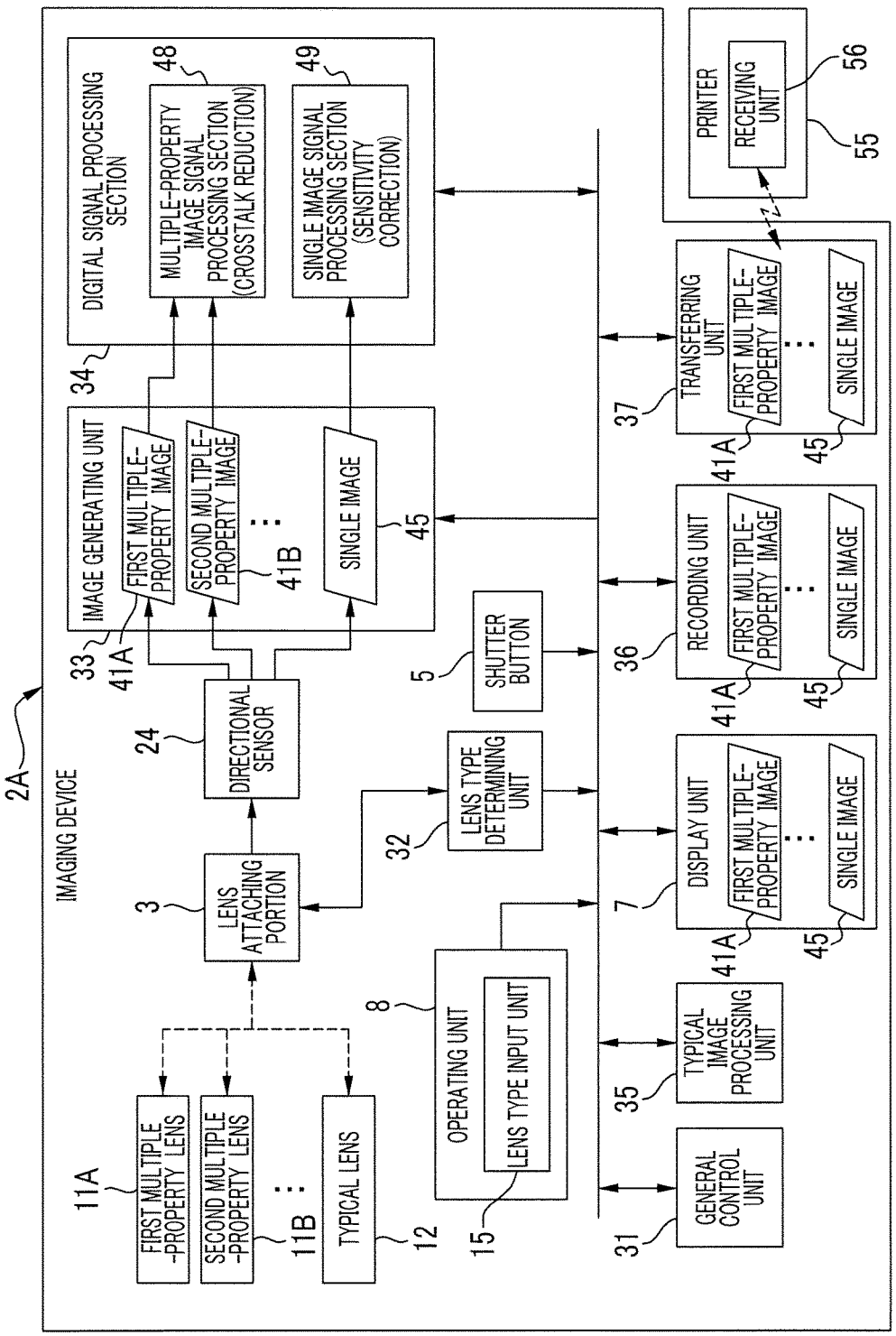

FIG. 24 is a block diagram illustrating an electric configuration of an imaging device of a second embodiment.

Figure 25:
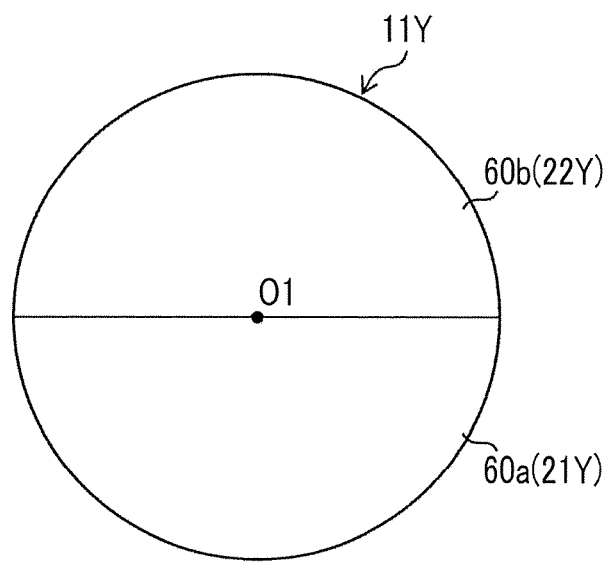

FIG. 25 is an exterior view of a multiple-property lens of an imaging device of a third embodiment.

Figure 26:
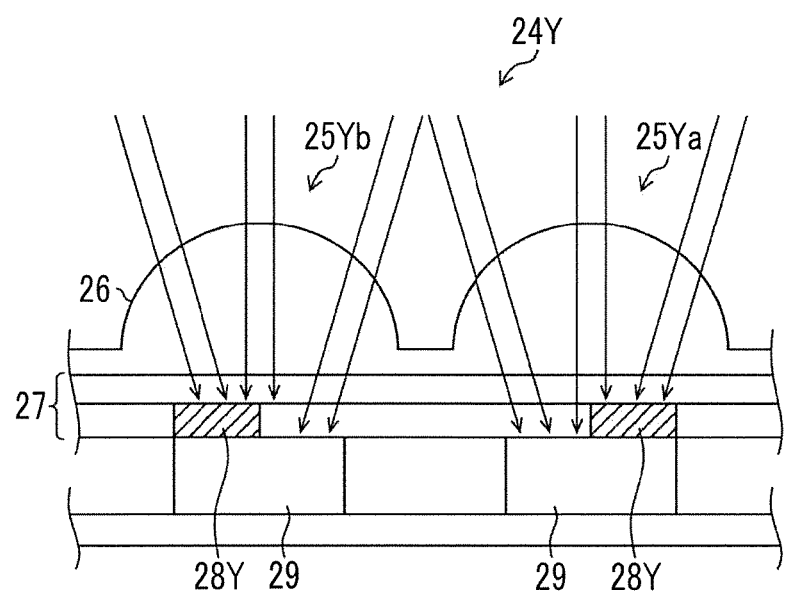

FIG. 26 is an enlarged cross-sectional view illustrating a part of a directional sensor of the imaging device of the third embodiment.

Figure 27:
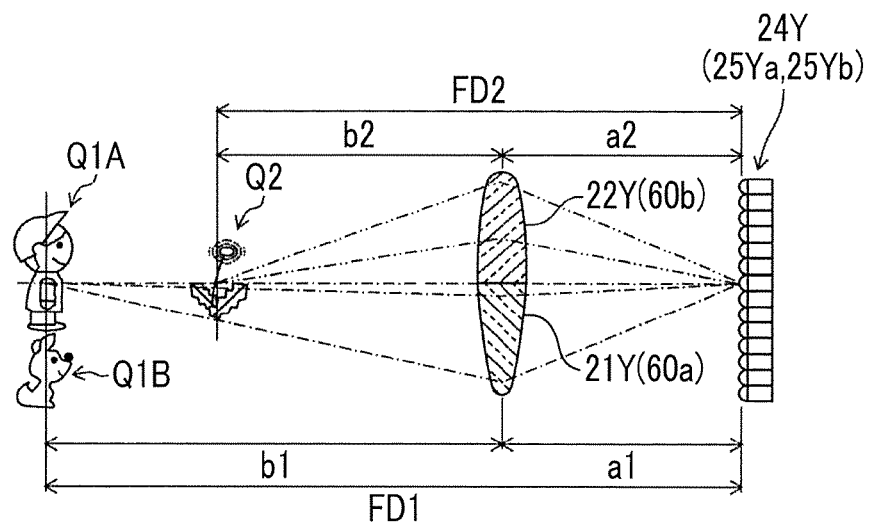

FIG. 27 is a diagram for describing an imaging mechanism that uses the multiple-property lens of the imaging device of the third embodiment.

Figure 28:
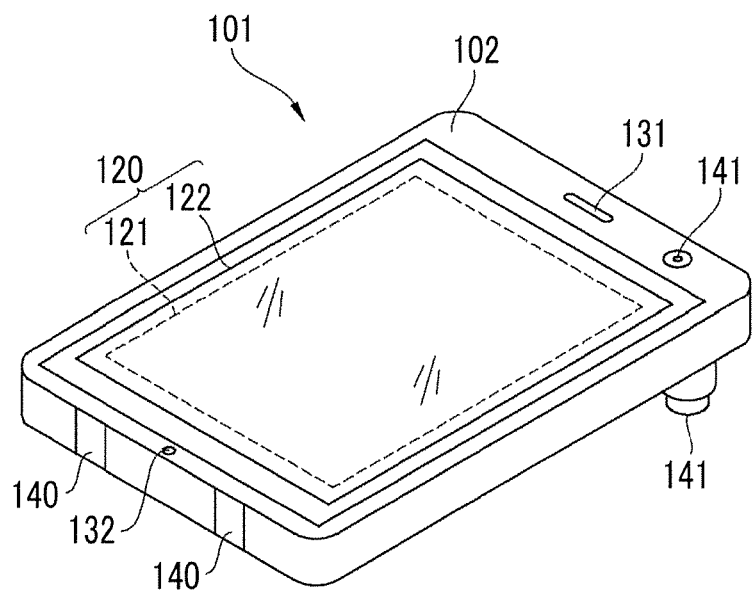

FIG. 28 is a diagram illustrating the exterior of a smartphone that is one embodiment of the imaging device of the present invention.

Figure 29:
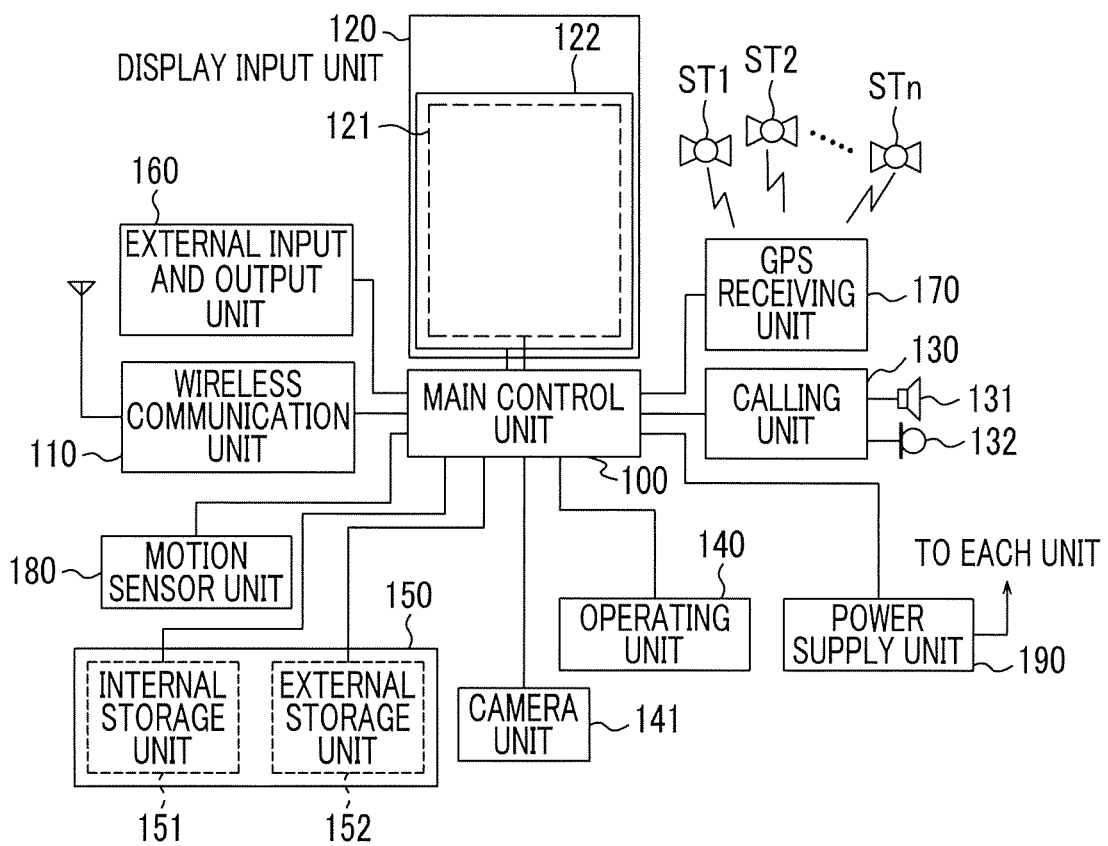

FIG. 29 is a block diagram illustrating a configuration of the smartphone illustrated in FIG. 28.

Figure 30:
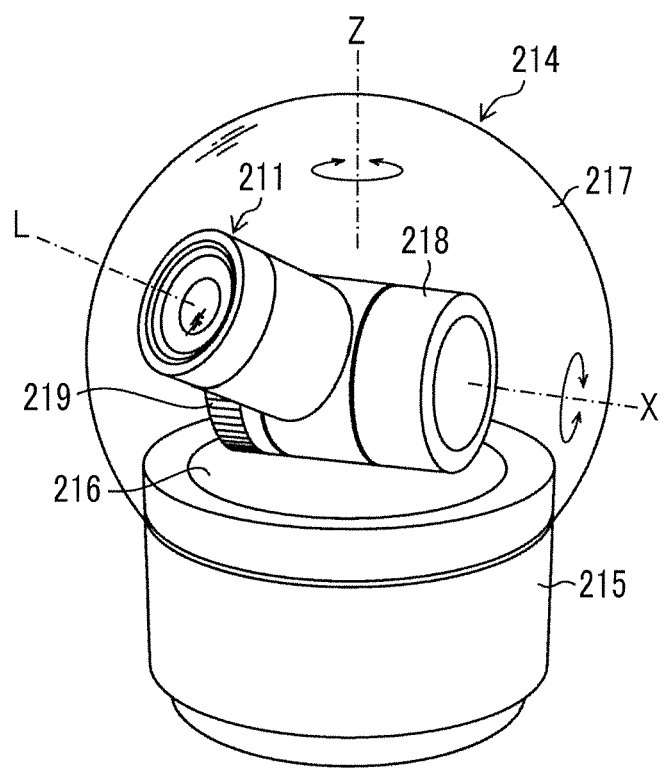

FIG. 30 is a perspective view illustrating one example of an automatic tracking imaging device to which the present invention can be applied.

DESCRIPTION OF THE PREFERRED EMBODIMENTS

First Embodiment

<Overall Configuration of Imaging Device>

Figure 1:
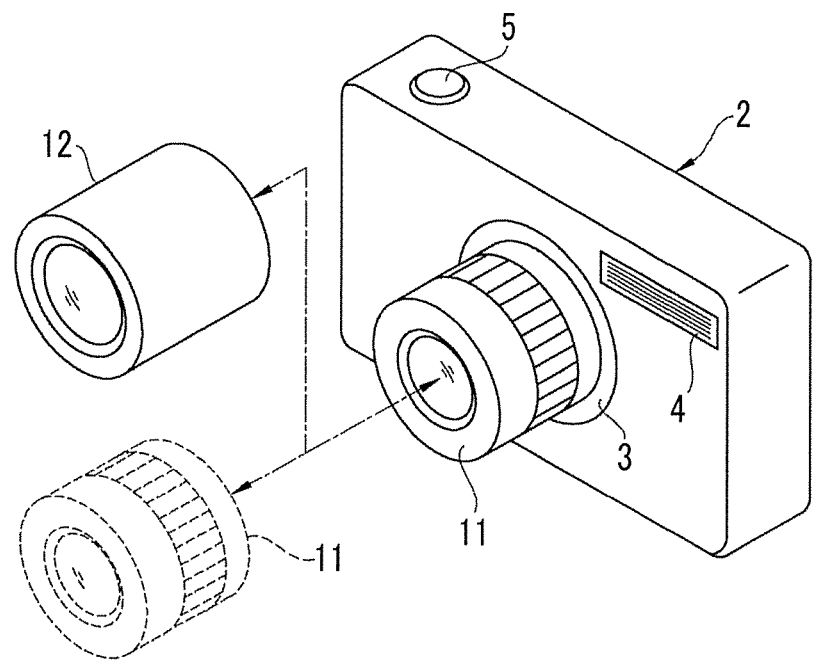
FIG. 1 is a perspective front view of an imaging device of a first embodiment.
Figure 2:
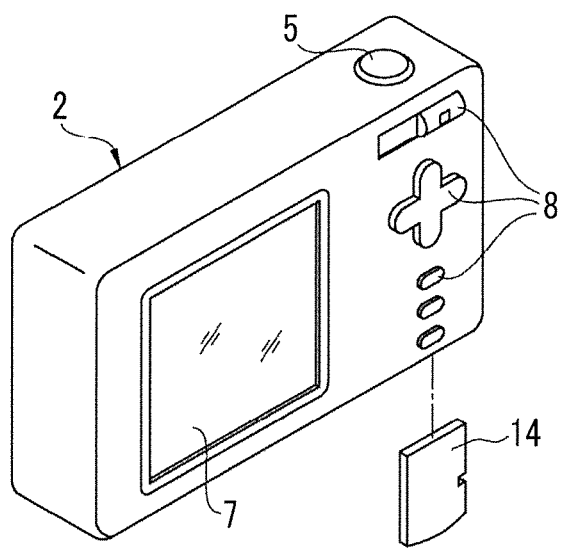
FIG. 2 is a perspective rear view of the imaging device of the first embodiment.

FIG. 1 is a perspective front view of an imaging device 2, and FIG. 2 is a perspective rear view of the imaging device 2. The imaging device 2 of the present embodiment is an interchangeable lens digital camera.

As illustrated in FIG. 1 and FIG. 2, a lens attaching portion 3 and a strobe light emitting unit 4 are disposed on the front surface of the imaging device 2. A plurality of types of lenses including a multiple-property lens 11 and a typical lens 12 described later is selectively attached to the lens attaching portion 3.

A shutter button 5 is disposed on the top surface of the imaging device 2. A display unit 7 and an operating unit 8 are disposed on the rear surface of the imaging device 2. A loading unit (not illustrated) into which a memory card 14 (corresponds to a recording medium of the present invention) is loaded is disposed on the lower surface of the imaging device 2. The display unit 7 displays a live view image by functioning as an electronic viewfinder at the time of an imaging mode. In addition, the display unit 7 at the time of image playback plays back and displays an image on the basis of image data recorded in the memory card 14.

The operating unit 8 includes a power switch, a mode switching switch, a cross key, an execution key, and a lens type input unit 15 (refer to FIG. 3) that corresponds to an input unit of the present invention. The power switch is operated at the time of switching a power supply of the imaging device 2 ON and OFF. The mode switching switch is operated at the time of switching the operating mode of the imaging device 2. The imaging device 2 has an imaging mode of acquiring a subject image by imaging a subject, a playback mode of playing back and displaying a captured subject image, and the like.

The cross key and the execution key are operated at the time of displaying a menu screen or a setting screen on the display unit 7, moving a cursor displayed in the menu screen or the setting screen, confirming various settings of the imaging device 2, or the like.

The lens type input unit 15 (refer to FIG. 3) is an input unit for inputting a type of lens (the multiple-property lens 11 or the typical lens 12) attached to the lens attaching portion 3. The lens type input unit 15 referred hereto includes the above cross key and the execution key for selection and input of a type of lens on the menu screen.

Figure 3:
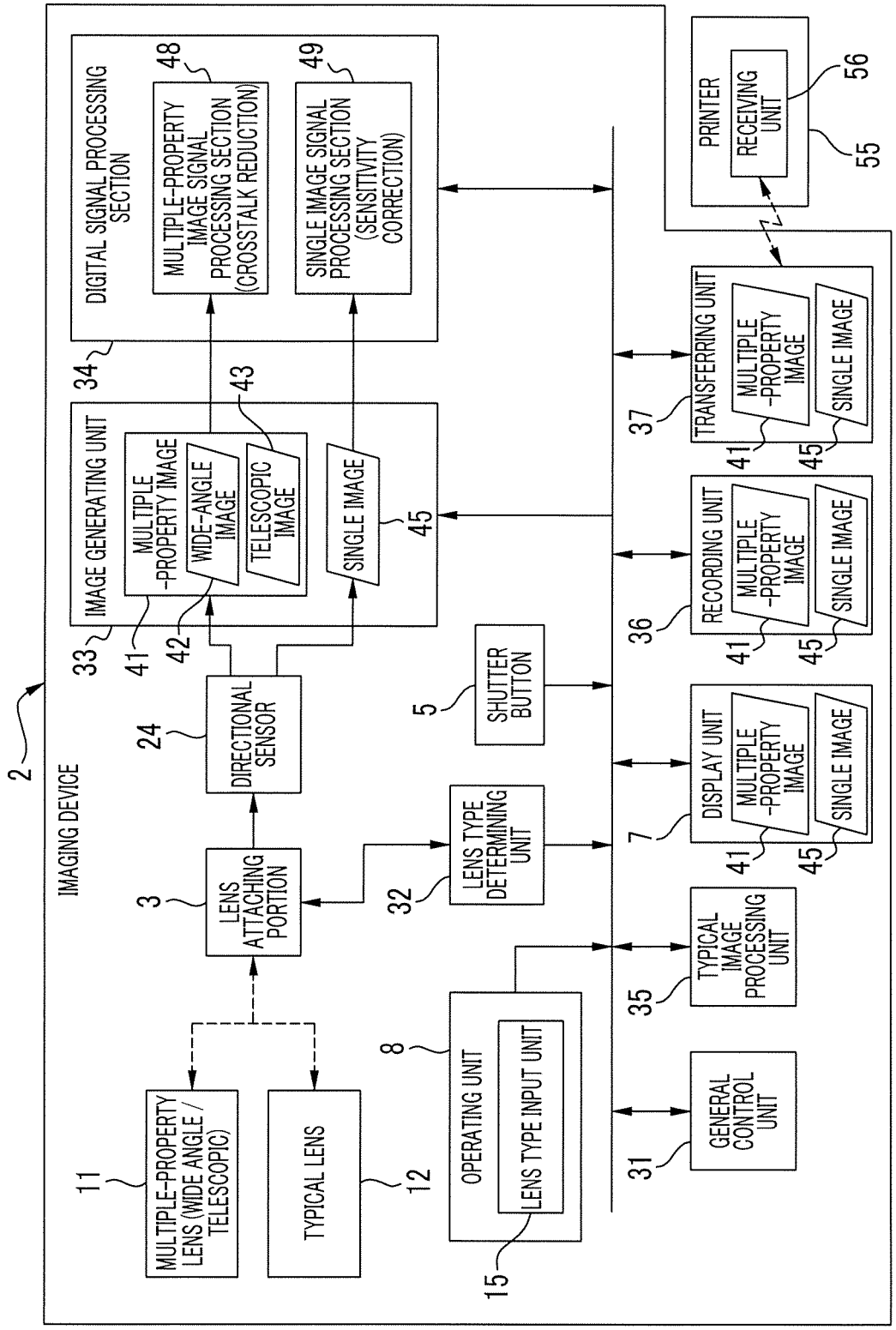
FIG. 3 is a block diagram illustrating an electric configuration of the imaging device of the first embodiment.

FIG. 3 is a block diagram illustrating an electric configuration of the imaging device 2. As illustrated in FIG. 3, a directional sensor 24 in the imaging device 2 receives a luminous flux that is incident through the multiple-property lens 11 or the typical lens 12 attached to the lens attaching portion 3. Hereinafter, the multiple-property lens 11, the typical lens 12, and the directional sensor 24 will be described in detail.

<Configurations of Multiple-Property Lens and Directional Sensor>

Figure 4:
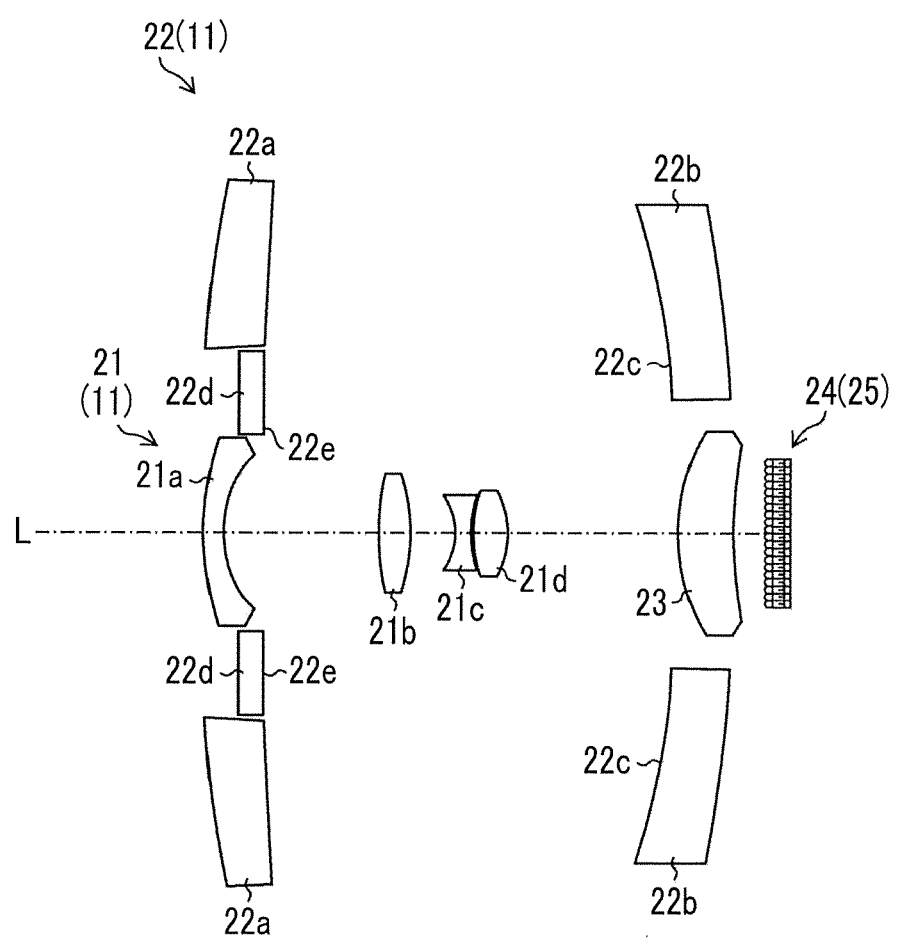
FIG. 4 is a diagram illustrating cross-sectional configurations of a multiple-property lens attached to a lens attaching portion and a directional sensor.

FIG. 4 is a diagram illustrating cross-sectional configurations of the multiple-property lens 11 attached to the lens attaching portion 3 (not illustrated in FIG. 4) and the directional sensor 24.

As illustrated in FIG. 4, the multiple-property lens 11 has a plurality of areas, and each of the plurality of areas has an independent property. Specifically, the multiple-property lens 11, as the above plurality of areas, includes a first optical system 21 (corresponds to a first area of the present invention) and a second optical system 22 (corresponds to a second area of the present invention) that are areas having properties independent of each other. The "properties independent of each other" means that the properties of the plurality of areas are different from each other. The first optical system 21 and the second optical system 22 are configured of optical systems having different focal lengths (properties) in the multiple-property lens 11. That is, the multiple-property lens 11 includes the first optical system 21 configured of a "wide-angle image imaging lens group (wide-angle lens)" and the second optical system 22 configured of a "telescopic image imaging lens group (telescopic lens)", and a wide-angle image and a telescopic image are captured at the same time with the directional sensor 24.

The first optical system 21 includes a first wide-angle lens 21a, a second wide-angle lens 21b, a third wide-angle lens 21c, a fourth wide-angle lens 21d, and a common lens 23 that are arranged on a same optical axis L. The second optical system 22 includes a first telescopic lens 22a, a first telescopic reflector 22b in which a first telescopic reflective mirror 22c is disposed, a second telescopic reflector 22d in which a second telescopic reflective mirror 22e is disposed, and the common lens 23.

The first optical system 21 (particularly, the first wide-angle lens 21a, the second wide-angle lens 21b, the third wide-angle lens 21c, and the fourth wide-angle lens 21d) forms a central optical system. The second optical system 22 (particularly, the first telescopic lens 22a, the first telescopic reflector 22b, the first telescopic reflective mirror 22c, the second telescopic reflector 22d, and the second telescopic reflective mirror 22e) is concentrically arranged in a part around the first optical system 21 with the first optical system 21 as a center. Therefore, the second optical system 22 forms an annular optical system. The common lens 23 is arranged on the optical axis L and is shared by the first optical system 21 and the second optical system 22.

Accordingly, the second optical system 22 includes a lens group (the first telescopic lens 22a) and a reflective mirror group (the first telescopic reflective mirror 22c and the second telescopic reflective mirror 22e) disposed around a lens group (the first wide-angle lens 21a to the fourth wide-angle lens 21d and the common lens 23) constituting the first optical system 21, has the same optical axis L as the first optical system 21, and has a different focal length from the first optical system 21. Therefore, each of the first optical system 21 and the second optical system 22 (a plurality of areas of the present invention) of the multiple-property lens 11 has an independent property.

The directional sensor 24 has a light receiving surface that is perpendicular to the optical axis L. A plurality of types of pixels (may be referred to as a light receiving sensor) 25 that is configured of two-dimensionally arranged photoelectric conversion elements is formed on the light receiving surface. The directional sensor 24 can receive wide-angle image light of a luminous flux incident through the first optical system 21 and telescopic image light of a luminous flux incident through the second optical system 22 at the same time and can output an imaging signal for generating a wide-angle image and an imaging signal for generating a telescopic image. That is, the directional sensor 24 has the plurality of types of pixels 25 that is the plurality of types of pixels 25 disposed in correspondence with each of the first optical system 21 and the second optical system 22 and that selectively receives a luminous flux passing a corresponding optical system of the first optical system 21 and the second optical system 22 by pupil division of the luminous flux.

Figure 5:
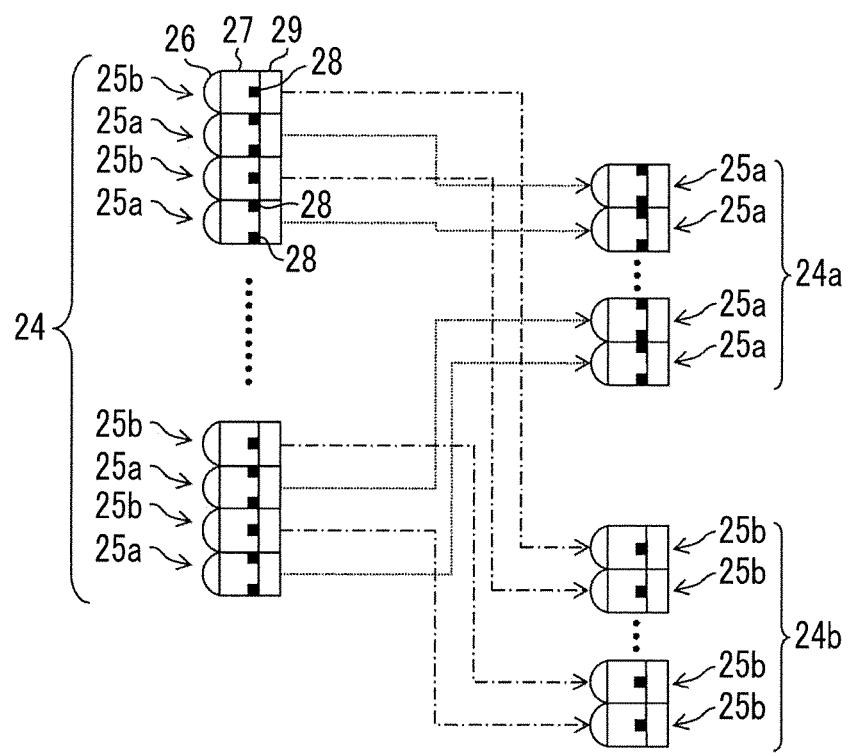
FIG. 5 is a diagram illustrating a detailed cross-sectional configuration example of the directional sensor illustrated in FIG. 4.

FIG. 5 is a diagram illustrating a detailed cross-sectional configuration example of the directional sensor 24 illustrated in FIG. 4.

As illustrated in FIG. 5, the plurality of types of pixels 25 constituting the directional sensor 24 includes a "first pixel 25a for wide-angle image" corresponding to the first optical system 21 and a "second pixel 25b for telescopic image" corresponding to the second optical system 22. The first pixel 25a and the second pixel 25b are two-dimensionally alternately arranged [a so-called checkered pattern (checkered flag)]. A plurality of the first pixels 25a included in the directional sensor 24 constitutes a "first light receiving section 24a for receiving the wide-angle image light passing the first optical system 21" and outputs an imaging signal for generating a wide-angle image. A plurality of the second pixels 25b included in the directional sensor 24 constitutes a "second light receiving section 24b for receiving the telescopic image light passing the second optical system 22" and outputs an imaging signal for generating a telescopic image.

Each of the first pixel 25a and the second pixel 25b has a microlens 26, an interlayer 27, and a photodiode (photoelectric conversion element) 29. The interlayer 27 is arranged between the microlens 26 and the photodiode 29. A light shielding mask 28 is disposed in the interlayer 27.

Figure 6:
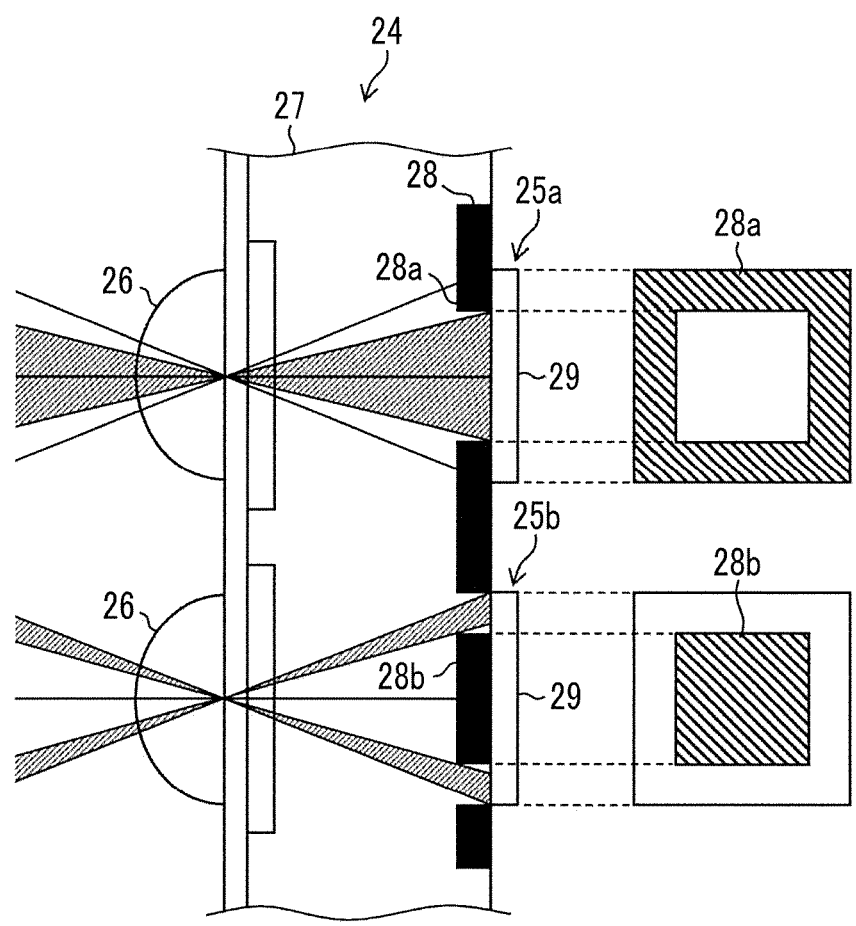
FIG. 6 is a descriptive diagram for describing the shape of a light shielding mask in each of a first pixel and a second pixel.

FIG. 6 is a descriptive diagram for describing the shape of the light shielding mask 28 in each of the first pixel 25a and the second pixel 25b.

As illustrated in FIG. 6, the light shielding mask 28 includes a first mask portion 28a covering a peripheral portion of a light receiving surface of the photodiode 29 of the first pixel 25a and a second mask portion 28b covering a central portion of the light receiving surface of the photodiode 29 of the second pixel 25b. The shapes of the first mask portion 28a and the second mask portion 28b are determined according to correspondence with any of the first optical system 21 and the second optical system 22. The first mask portion 28a and the second mask portion 28b shield light from a non-corresponding optical system of the first optical system 21 and the second optical system 22 and cause light from a corresponding optical system to be received by the photodiode 29 without shielding the light.

Accordingly, the shapes of the first mask portion 28a and the second mask portion 28b differ according to respective corresponding optical systems. Thus, in the present embodiment, the area of the first mask portion 28a is different from the area of the second mask portion 28b. Consequently, a difference in sensitivity occurs between the first pixel 25a and the second pixel 25b according to the difference in area between the first mask portion 28a and the second mask portion 28b.

While the plurality of types of pixels 25 that selectively receives light passing a corresponding optical system of the first optical system 21 and the second optical system 22 by pupil division of the light is realized by the light shielding mask 28 in the present embodiment, pupil division may be realized by another method. For example, the light shielding mask 28 may be disposed in a stage before the microlens 26, for example, between the microlens 26 and the common lens 23 (refer to FIG. 4). Alternatively, a light shielding member (for example, a liquid crystal shutter) other than the light shielding mask 28 may be used.

A member other than the light shielding mask 28 may be disposed in the interlayer 27. For example, color filters of RGB (red, green, and blue) or the like, interconnects, and circuits may be disposed in the interlayer 27.

Figure 7:
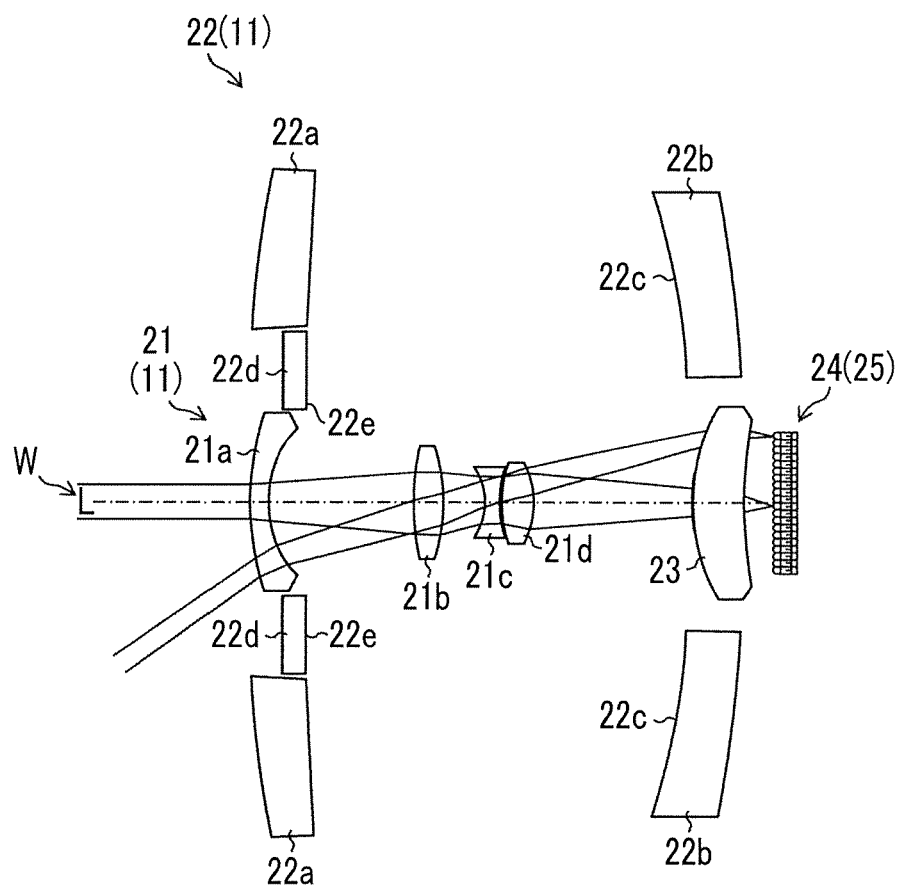
FIG. 7 is a diagram illustrating the optical path of wide-angle image light that is a luminous flux incident on the multiple-property lens and the directional sensor illustrated in FIG. 4.

FIG. 7 is a diagram illustrating the optical path of wide-angle image light W that is a luminous flux incident on the multiple-property lens 11 (particularly, the first optical system 21) and the directional sensor 24 illustrated in FIG. 4. As illustrated in FIG. 7, the wide-angle image light W passes the first wide-angle lens 21a, the second wide-angle lens 21b, the third wide-angle lens 21c, the fourth wide-angle lens 21d, and the common lens 23 of the first optical system 21 in order. Accordingly, a wide-angle image is formed on the directional sensor 24.

Figure 8:
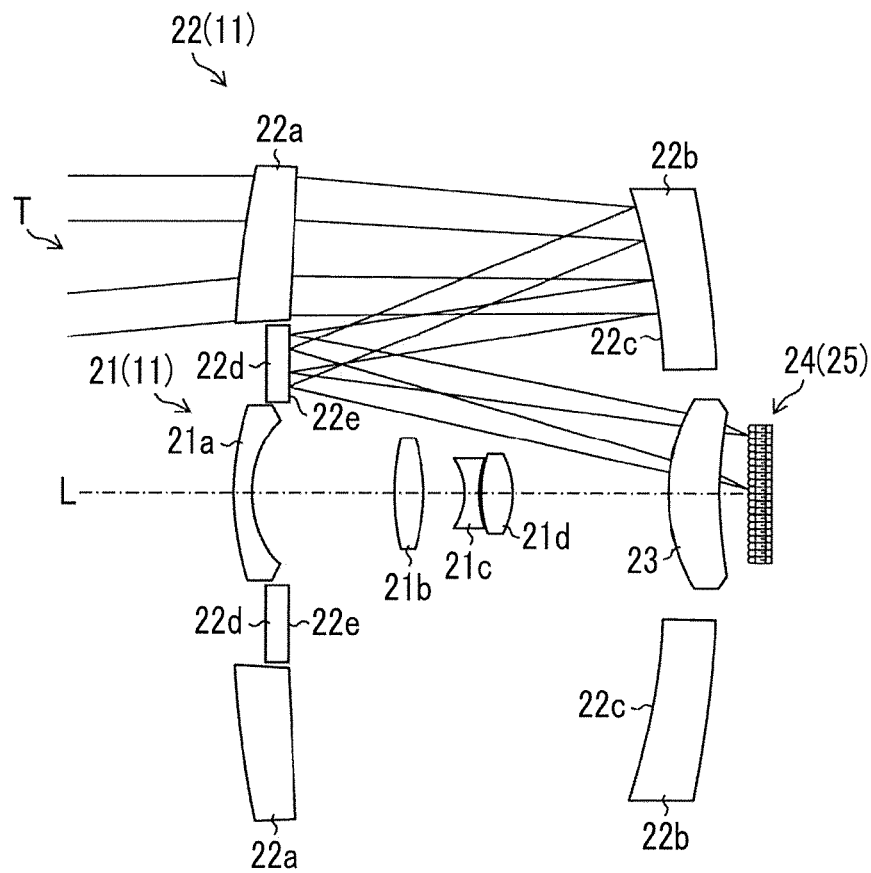
FIG. 8 is a diagram illustrating the optical path of telescopic image light that is a luminous flux incident on the multiple-property lens and the directional sensor illustrated in FIG. 4.

FIG. 8 is a diagram illustrating the optical path of telescopic image light T that is a luminous flux incident on the multiple-property lens 11 (particularly, the second optical system 22) and the directional sensor 24 illustrated in FIG. 4. As illustrated in FIG. 8, the telescopic image light T passes the first telescopic lens 22a, is reflected by each of the first telescopic reflective mirror 22c and the second telescopic reflective mirror 22e, and then passes the common lens 23. Accordingly, a telescopic image is formed on the directional sensor 24. Accordingly, the optical path being folded by reflection by each of the first telescopic reflective mirror 22c and the second telescopic reflective mirror 22e can decrease the length in the direction of the optical axis L of the second optical system 22 that is for capturing of a telescopic image and has a long focal length.

<Configurations of Typical Lens and Directional Sensor>

Figure 9:
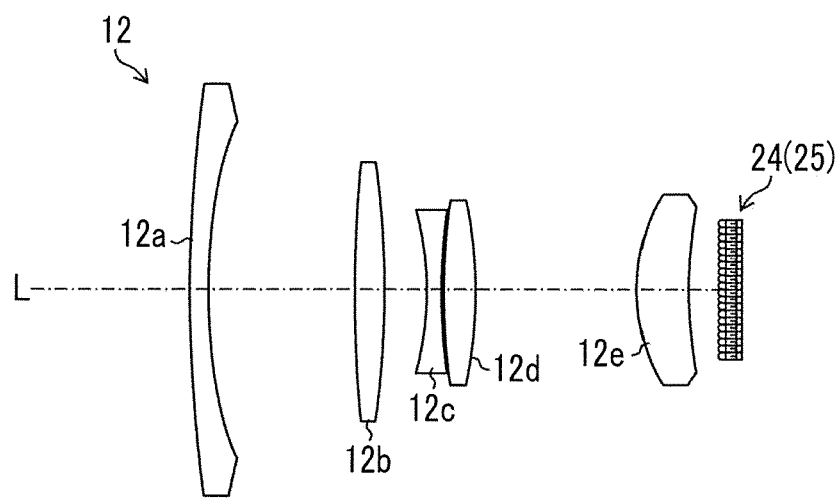
FIG. 9 is a diagram illustrating cross-sectional configurations of a typical lens attached to the lens attaching portion and the directional sensor.

FIG. 9 is a diagram illustrating cross-sectional configurations of the typical lens 12 attached to the lens attaching portion 3 (not illustrated in FIG. 9) and the directional sensor 24.

As illustrated in FIG. 9, the typical lens 12 has one property, that is, one focal length and one focal distance, unlike the multiple-property lens 11. The typical lens 12 is configured of a plurality of lenses including a first lens 12a, a second lens 12b, a third lens 12c, a fourth lens 12d, and a fifth lens 12e. Typical light (luminous flux) that passes each position in the typical lens 12 is incident on each of the plurality of types of pixels 25 constituting the directional sensor 24, that is, the first pixel 25a and the second pixel 25b.

Figure 10:
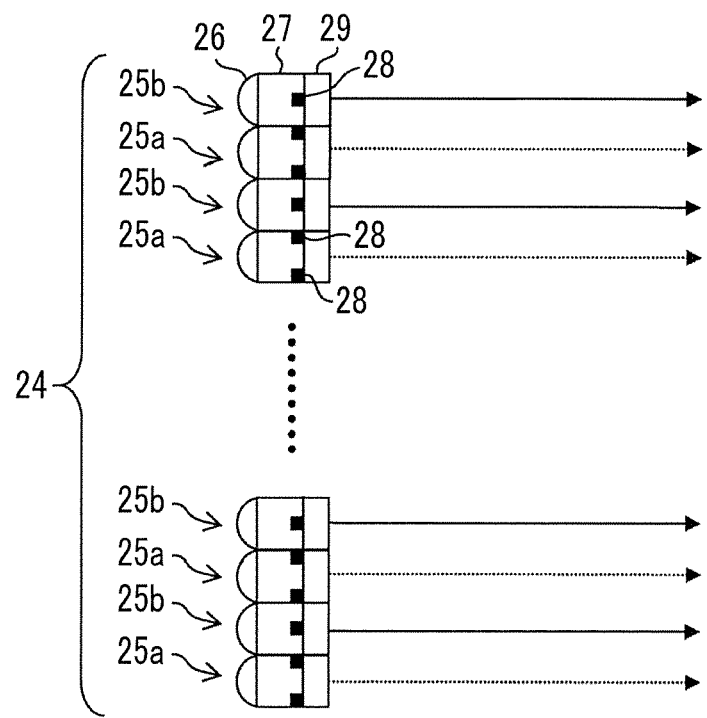
FIG. 10 is a diagram illustrating a detailed cross-sectional configuration example of the directional sensor illustrated in FIG. 9.

FIG. 10 is a diagram illustrating a detailed cross-sectional configuration example of the directional sensor 24 illustrated in FIG. 9. As illustrated in FIG. 10, the first pixel 25a and the second pixel 25b of the directional sensor 24 receive the typical light passing the typical lens 12 and output an imaging signal for generating a single image. At this point, as described above, the area of each of the first mask portion 28a and the second mask portion 28b in the directional sensor 24 is rendered different in correspondence with the first optical system 21 and the second optical system 22 of the multiple-property lens 11. Thus, a difference in sensitivity occurs between the first pixel 25a and the second pixel 25b. Consequently, in the case of attaching the typical lens 12 to the lens attaching portion 3, a different caused by the above difference in sensitivity occurs between the signal value of the imaging signal output from one of the first pixel 25a and the second pixel 25b of the directional sensor 24 adjacent to each other and the signal value of the imaging signal output from the other.

<Electric Configuration of Imaging Device>

Returning to FIG. 3, the imaging device 2 has a general control unit 31, a lens type determining unit 32, an image generating unit 33, a digital signal processing section 34, a typical image processing unit 35, a recording unit 36, and a transferring unit 37 in addition to the above lens attaching portion 3, the display unit 7, the operating unit 8, and the directional sensor 24.

The general control unit 31 is, for example, a central processing unit (CPU) and generally controls each unit of the imaging device 2 by executing in order various programs or data read out from a memory or the like not illustrated on the basis of a control signal from the operating unit 8.

The lens type determining unit 32 corresponds to a determining unit of the present invention and determines the type of lens (the multiple-property lens 11 or the typical lens 12) attached to the lens attaching portion 3. For example, in the case of a lens storing information that indicates the type of lens, the lens type determining unit 32 automatically determines the type of lens attached to the lens attaching portion 3 by reading out the information stored in the lens through the lens attaching portion 3. An engaging claw that engages with the lens attaching portion 3 when the lens is attached to the lens attaching portion 3 is disposed in the lens. Thus, in the case of the position of the engaging claw being different for each type of lens, the lens type determining unit 32 automatically determines the type of lens attached to the lens attaching portion 3 by detecting the position of the engaging claw of the lens. A method for automatically determining the type of lens attached to the lens attaching portion 3 is not particularly limited. Various known determination methods can be used.

In the case of inputting the type of lens attached to the lens attaching portion 3 into the above lens type input unit 15, the lens type determining unit 32 determines the type of lens attached to the lens attaching portion 3 on the basis of the input result.

The lens type determining unit 32 outputs the determination result of determination of the type of lens attached to the lens attaching portion 3 to each of the image generating unit 33, the digital signal processing section 34, the display unit 7, the recording unit 36, and the transferring unit 37.

The image generating unit 33, on the basis of the determination result for the type of lens input from the lens type determining unit 32, reads out an imaging signal from the plurality of types of pixels 25 of the directional sensor 24 in a reading format determined in advance for each type of lens and generates an image on the basis of the read imaging signal. At this point, the image generating unit 33 switches the type of generated image on the basis of the determination result for the type of lens input from the lens type determining unit 32.

Specifically, the image generating unit 33, in the case of the determination result for the type of lens input from the lens type determining unit 32 being equal to the "multiple-property lens 11", reads out an imaging signal in a reading format that reads out an imaging signal from each of the first pixel 25a of the first light receiving section 24a and the second pixel 25b of the second light receiving section 24b of the directional sensor 24 (refer to FIG. 5).

Next, the image generating unit 33 generates image data of a wide-angle image 42 on the basis of the imaging signal read out from the first pixel 25a of the first light receiving section 24a illustrated in above FIG. 5. In addition, the image generating unit 33 generates image data of a telescopic image 43 on the basis of the imaging signal read out from the second pixel 25b of the second light receiving section 24b. Accordingly, a multiple-property image 41 (corresponds to a plurality of images of the present invention) that is configured of the wide-angle image 42 and the telescopic image 43 is generated. The image generating unit 33 outputs image data of the multiple-property image 41 to the digital signal processing section 34.

The image generating unit 33, in the case of the determination result for the type of lens input from the lens type determining unit 32 being equal to the "typical lens 12", reads out an imaging signal in a reading format that an imaging signal is read out from all pixels 25 of the directional sensor 24 in order as illustrated in above FIG. 10. "All pixels 25" referred hereto are all of the pixels 25 used in image generation. The image generating unit 33, on the basis of the read imaging signal, generates image data of a single image 45 that corresponds to one image of the present invention. The image generating unit 33 outputs the image data of the single image 45 to the digital signal processing section 34.

The digital signal processing section 34 corresponds to an image correcting unit of the present invention and performs digital image processing (correction processing) for the image data input from the image generating unit 33. The digital signal processing section 34, on the basis of the determination result for the type of lens input from the lens type determining unit 32, switches the type of digital signal processing that is performed for the image data input from the image generating unit 33. Thus, the digital signal processing section 34 has a multiple-property image signal processing section 48 and a single image signal processing section 49.

<Multiple-Property Image Signal Processing (Crosstalk Reduction)>

The multiple-property image signal processing section 48 operates in the case of the determination result for the type of lens input from the lens type determining unit 32 being equal to the "multiple-property lens 11". The multiple-property image signal processing section 48 performs correction of removing, from image data that is generated in correspondence with one (corresponds to one area of the present invention) of the first optical system 21 and the second optical system 22 of the multiple-property lens 11, influence of a luminous flux passing the other (corresponding to an area other than the one area of the present invention), that is, interference of luminous fluxes (crosstalk).

Next, degradation of image quality that may be caused in the wide-angle image 42 and in the telescopic image 43 acquired with the above multiple-property lens 11 and the directional sensor 24 will be described.

Figure 11A:
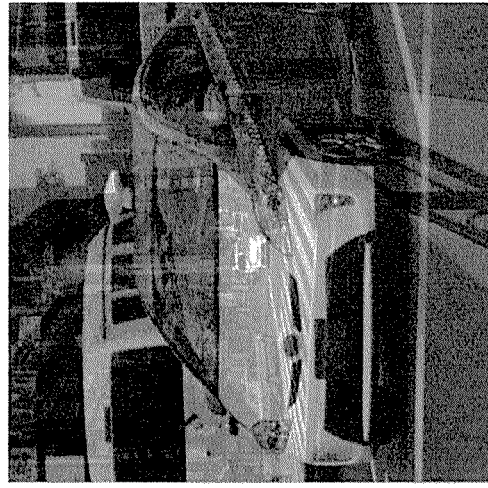
FIGS. 11A and 11B are diagrams illustrating one example of a wide-angle image and a telescopic image that receive influence of degradation of image quality due to interference of luminous fluxes between a first optical system and a second optical system.
Figure 11B:
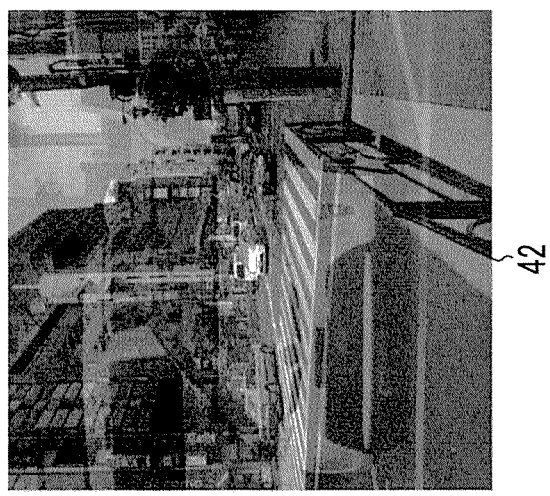

FIGS. 11A and 11B are diagrams illustrating one example of the wide-angle image 42 (refer to FIG. 11A) and the telescopic image 43 (refer to FIG. 11B) that receive influence of degradation of image quality due to interference (crosstalk) of luminous fluxes between the first optical system 21 and the second optical system 22.

In the case of having insufficient performance of pupil division of the wide-angle image light W (refer to FIG. 7) reaching the directional sensor 24 by passing the first optical system 21 and the telescopic image light T (refer to FIG. 8) reaching the directional sensor 24 by passing the second optical system 22, an image in which the wide-angle image 42 and the telescopic image 43 are mixed in an overlaying manner is acquired due to insufficient separation of both image light. That is, if the telescopic image light T filters into the first light receiving section 24a that is intended to receive only the wide-angle image light W, a wide-angle image that is overlaid by a part of a telescopic image component is acquired as illustrated in FIG. 11A. Similarly, if the wide-angle image light W filters into the second light receiving section 24b that is intended to receive only the telescopic image light T, a telescopic image that is overlaid by a part of a wide-angle image component is acquired as illustrated in FIG. 11B.

Accordingly, if interference exists between the wide-angle image light W passing the first optical system 21 and the telescopic image light T passing the second optical system 22, a signal of an image component that is not supposed to be separated and received is mixed into output of each pixel 25 constituting the directional sensor 24.

FIG. 12 is a conceptual diagram for describing a mechanism of interference of the wide-angle image light W and the telescopic image light T between the first optical system 21 and the second optical system 22.

In FIG. 12, the reference sign "Iw1" indicates the true wide-angle image 42, and the reference sign "It1" indicates the true telescopic image 43. The "true wide-angle image Iw1" and the "true telescopic image It1" referred hereto are images that are acquired by imaging in the state of no interference between the wide-angle image light W passing the first optical system 21 and the telescopic image light T passing the second optical system 22. The reference sign "Iw2" indicates an output wide-angle image that is generated from an imaging signal actually output from the first light receiving section 24a (first pixel 25a), and the reference sign "It2" indicates an output telescopic image that is generated from an imaging signal actually output from the second light receiving section 24b (second pixel 25b).

In the case of capturing the wide-angle image 42 and the telescopic image 43 with the imaging device 2 that includes the multiple-property lens 11 and the directional sensor 24, imaging signals representing the true wide-angle image Iw1 and the true telescopic image It1 are output from the directional sensor 24 if the light shielding mask 28 of the directional sensor 24 has sufficient pupil division performance. However, as described above, in the case of interference existing between the wide-angle image light W and the telescopic image light T with insufficient pupil division performance, an imaging signal that represents multiple images in which the wide-angle image 42 and the telescopic image 43 are mixed is output from each of the first light receiving section 24a and the second light receiving section 24b as the output wide-angle image Iw2 and the output telescopic image It2.

For example, distribution information (indicator) that indicates a component of the wide-angle image light W (luminous flux) of the true wide-angle image Iw1 appropriately received by the first light receiving section 24a (first pixel 25a) is denoted by a "wide-angle detected gain distribution D1", and distribution information that indicates a component thereof inappropriately received by the second light receiving section 24b (second pixel 25b) is denoted by a "wide-angle crosstalk gain distribution D2". Distribution information that indicates a component of the telescopic image light T (luminous flux) of the true telescopic image It1 inappropriately received by the first light receiving section 24a (first pixel 25a) is denoted by a "telescopic crosstalk gain distribution D3", and distribution information that indicates a component thereof appropriately received by the second light receiving section 24b (second pixel 25b) is denoted by a "telescopic detected gain distribution D4".

A wide-angle image component that is a wide-angle image component acquired by applying the wide-angle detected gain distribution D1 to the true wide-angle image Iw1 and that is received by the first light receiving section 24a (first pixel 25a) is denoted by a "true wide-angle image component E1". A telescopic image component that is a telescopic image component acquired by applying the telescopic crosstalk gain distribution D3 to the true telescopic image It1 and that is received by the first light receiving section 24a (first pixel 25a) is denoted by a "crosstalk telescopic image component E2". A wide-angle image component that is a wide-angle image component acquired by applying the wide-angle crosstalk gain distribution D2 to the true wide-angle image Iw1 and that is received by the second light receiving section 24b (second pixel 25b) is denoted by a "crosstalk wide-angle image component E3". A telescopic image component that is a telescopic image component acquired by applying the telescopic detected gain distribution D4 to the true telescopic image It1 and that is received by the second light receiving section 24b (second pixel 25b) is denoted by a "true telescopic image component E4".

In this case, the output wide-angle image Iw2 that is generated from the imaging signal output from the first light receiving section 24a (first pixel 25a) is based on an image that is acquired by adding the true wide-angle image component E1 and the crosstalk telescopic image component E2. The output telescopic image It2 that is generated from the imaging signal output from the second light receiving section 24b (second pixel 25b) is based on an image that is acquired by adding the crosstalk wide-angle image component E3 and the true telescopic image component E4.

As the pupil division performance of the imaging device 2 is more excellent, the wide-angle image light W and the telescopic image light T are accurately separated and received by the directional sensor 24, and the component proportions of the crosstalk telescopic image component E2 and the crosstalk wide-angle image component E3 approximate to zero (blank). The output wide-angle image Iw2 approximates to the true wide-angle image Iw1, and the output telescopic image It2 approximates to the true telescopic image It1. As the pupil division performance of the imaging device 2 is worse, the wide-angle image light W and the telescopic image light T are received by the directional sensor 24 without being sufficiently separated, and the component proportions of the crosstalk telescopic image component E2 and the crosstalk wide-angle image component E3 are increased. The proportion of the crosstalk telescopic image component E2 in the output wide-angle image Iw2 is increased, and the proportion of the crosstalk wide-angle image component E3 in the output telescopic image It2 is increased.

Accordingly, the imaging signal that is output from the directional sensor 24 in the case of interference of luminous fluxes (the wide-angle image light W and the telescopic image light T) existing between the first optical system 21 and the second optical system 22 corresponds to an imaging signal in which an image component acquired by applying a detected gain distribution to a true image and an image component acquired by applying a crosstalk gain distribution to an image in another channel are added. Since such crosstalk in the directional sensor 24 causes output of an image (imaging signal) in which the wide-angle image 42 and the telescopic image 43 overlay each other, a captured image of degraded image quality is output from the imaging device 2 that does not have sufficient pupil division performance.

Therefore, the multiple-property image signal processing section 48, for the image data of the wide-angle image 42 and the telescopic image 43, performs image correction processing (crosstalk reduction processing) of removing (removing referred hereto includes reducing) crosstalk in the directional sensor 24. Specifically, the multiple-property image signal processing section 48 performs correction processing for both image data of the wide-angle image 42 and the telescopic image 43 on the basis of an inverse matrix of a matrix that is configured of the detected gain distribution and the crosstalk gain distribution of the wide-angle image 42 and the telescopic image 43. Hereinafter, a specific example of the image correction processing based on the inverse matrix of the matrix configured of the detected gain distribution and the crosstalk gain distribution will be described.

FIG. 13 is a diagram illustrating a relationship among the true wide-angle image Iw1, the true telescopic image It1, the output wide-angle image Iw2, the output telescopic image It2, and a matrix M configured of the detected gain distribution and the crosstalk gain distribution. "The true wide-angle image Iw1, the true telescopic image It1, the output wide-angle image Iw2, and the output telescopic image It2" illustrated in FIG. 13 respectively correspond to "the true wide-angle image Iw1, the true telescopic image It1, the output wide-angle image Iw2, and the output telescopic image It2" illustrated in above FIG. 12. The reference signs "W1", "W2", "T1", and "T2" in FIG. 13 will be described later.

The output wide-angle image Iw2 and the output telescopic image It2 that are generated from the imaging signals output from the directional sensor 24 (the first pixel 25a and the second pixel 25b) are represented by the product of "the matrix M configured of the detected gain distribution and the crosstalk gain distribution" and "the true wide-angle image Iw1 and the true telescopic image It1 which are the original wide-angle image 42 and the telescopic image 43 generated from luminous fluxes passing each of the first optical system 21 and the second optical system 22".

The matrix M that is configured of the detected gain distribution and the crosstalk gain distribution is a 2×2 matrix that is configured of the wide-angle detected gain distribution D1, the wide-angle crosstalk gain distribution D2, the telescopic crosstalk gain distribution D3, and the telescopic detected gain distribution D4. "The wide-angle detected gain distribution D1, the wide-angle crosstalk gain distribution D2, the telescopic crosstalk gain distribution D3, and the telescopic detected gain distribution D4" respectively correspond to "the wide-angle detected gain distribution D1, the wide-angle crosstalk gain distribution D2, the telescopic crosstalk gain distribution D3, and the telescopic detected gain distribution D4" illustrated in above FIG. 12.

Figure 14:
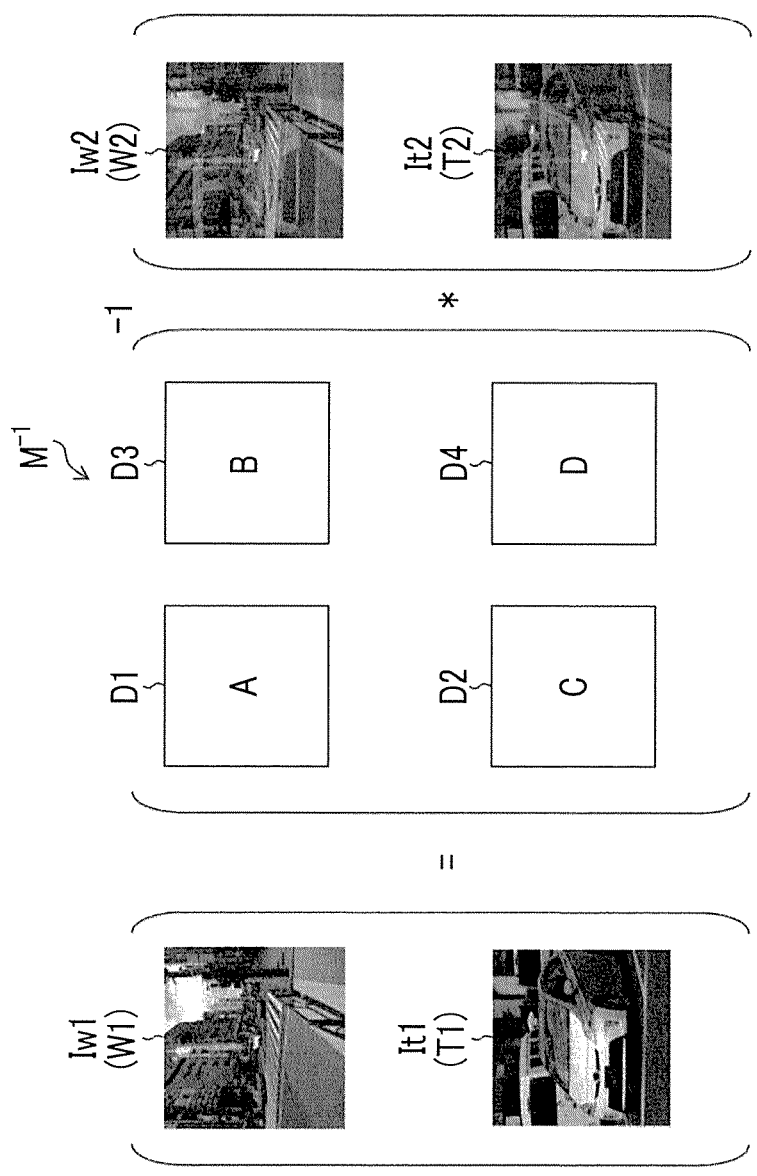
FIG. 14 is a diagram illustrating a determinant that is acquired by applying an inverse matrix M-1 of "the matrix M configured of the detected gain distribution and the crosstalk gain distribution" to a determinant illustrated in FIG. 13.

FIG. 14 is a diagram illustrating a determinant that is acquired by applying an inverse matrix $M^{-1}$ of "the matrix M configured of the detected gain distribution and the crosstalk gain distribution" to a determinant illustrated in FIG. 13. As illustrated in FIG. 14, "the true wide-angle image Iw1 and the true telescopic image It1 which are the original wide-angle image 42 and the telescopic image 43" can be acquired by the product of the inverse matrix $M^{-1}$ of "the matrix M configured of the detected gain distribution and the crosstalk gain distribution" and "the output wide-angle image Iw2 and the output telescopic image It2 that are generated from the imaging signals output from the directional sensor 24 (the first pixel 25a and the second pixel 25b)".

FIG. 15 is a diagram illustrating a determinant that is represented by simplifying the determinant in FIG. 14. In FIG. 15, "W1" collectively represents pixel components (pixel values) of the true wide-angle image Iw1. "T1" collectively represents pixel components of the true telescopic image It1. "W2" collectively represents pixel components of the output wide-angle image Iw2. "T2" collectively represents pixel components of the output telescopic image It2. In addition, in FIG. 15, "A", "B", "C", and "D"

collectively represent respective elements constituting the wide-angle detected gain distribution D1, the telescopic crosstalk gain distribution D3, the wide-angle crosstalk gain distribution D2, and the telescopic detected gain distribution D4.

FIG. 16 is a diagram illustrating elements w1_11 to w1_mn constituting "W1" illustrated in above FIG. 15. That is, "W1" is configured of the elements w1_11 to w1_mn that correspond to the pixel components (pixel values) of the true wide-angle image Iw1. "m" and "n" denote integers greater than or equal to two. "m" and "n" may be the same or different.

Similarly, "W2", "T1", and "T2" illustrated in above FIG. 15 are respectively configured of elements w2_11 to w2_mn, t1_11 to t1_mn, and t2_11 to t2_mn that correspond to the pixel components (pixel values) of the output wide-angle image Iw2, the true telescopic image It1, and the output telescopic image It2 (not illustrated). In addition, "A", "B", "C", and "D" illustrated in FIG. 15 are respectively configured of elements a11 to amn, b11 to bmn, c11 to cmn, and d11 to dmn that are determined according to each pixel of the wide-angle image 42 and the telescopic image 43 (not illustrated).

FIG. 17 is a diagram illustrating a calculation formula of "w1_ij" derived on the basis of the determinant illustrated in above FIG. 15. FIG. 18 is a diagram illustrating a calculation formula of "t1_ij" derived on the basis of the determinant illustrated in above FIG. 15. In FIG. 17 and FIG. 18, "i" denotes an integer of any of 1 to m, and "j" denotes an integer of any of 1 to n. As illustrated in FIG. 17 and FIG. 18, the elements w1_11 to w1_mn corresponding to the pixel components (pixel values) of the true wide-angle image Iw1 and the elements t1_11 to t1_mn corresponding to the pixel components (pixel values) of the true telescopic image It1 can be calculated by calculation from the output wide-angle image Iw2, the output telescopic image It2, and the inverse matrix $M^{-1}$.

The multiple-property image signal processing section 48, on the basis of the calculation formulas represented by FIG. 17 and FIG. 18, can reduce influence of "a telescopic image component mixed into the wide-angle image 42" or influence of "a wide-angle image component mixed into the telescopic image 43" by performing the correction processing for both image data of the wide-angle image 42 and the telescopic image 43 acquired from the image generating unit 33.

From the viewpoint of strictly performing the correction processing, the detected gain distribution and the crosstalk gain distribution are preferably configured of elements in the same number as the number of pixels constituting each of the wide-angle image 42 and the telescopic image 43, and the inverse matrix $M^{-1}$ for each element (each corresponding pixel) constituting the detected gain distribution and the crosstalk gain distribution is preferably used in the multiple-property image signal processing section 48. In the case of "the elements constituting the detected gain distribution and the crosstalk gain distribution" approximating to "a part or all of the pixels constituting the wide-angle image 42 and the telescopic image 43" as in the case of little shading, "the elements constituting the detected gain distribution and the crosstalk gain distribution" may be represented by a common representative value in the range of the approximation from the viewpoint of prioritizing calculation cost. Therefore, in the case of "all of the pixels constituting the wide-angle image and the telescopic image" approximating, the detected gain distribution and the crosstalk gain distribution can be represented by a single representative value, and "the correction processing that is based on the inverse matrix of the matrix configured of the detected gain distribution and the crosstalk gain distribution" can be performed simply and promptly.

The matrix M (refer to "A", "B", "C", and "D" in FIG. 15) that is based on the wide-angle detected gain distribution D1, the wide-angle crosstalk gain distribution D2, the telescopic crosstalk gain distribution D3, and the telescopic detected gain distribution D4 is determined by the multiple-property lens 11 and the directional sensor 24 used in imaging. The multiple-property image signal processing section 48 stores the elements of the inverse matrix $M^{-1}$ that is derived in advance from the matrix M, and applying the elements of the stored inverse matrix $M^{-1}$ to the output wide-angle image Iw2 and the output telescopic image It2 can reduce influence of the telescopic image light T in the wide-angle image 42 and reduce influence of the wide-angle image light W in the telescopic image 43.

While "the correction processing that is based on the inverse matrix $M^{-1}$ of the matrix M configured of the detected gain distribution and the crosstalk gain distribution" (hereinafter, referred to as crosstalk reduction processing) in the above multiple-property image signal processing section 48 is performed for both image data of the wide-angle image 42 and the telescopic image 43 acquired from the image generating unit 33, the present invention is not limited thereto. Both image data of the wide-angle image 42 and the telescopic image 43 generated by the image generating unit 33 may be temporarily stored in an image storage unit (memory or the like) not illustrated, and the multiple-property image signal processing section 48 may perform the correction processing by reading out both image data from the image storage unit.

The crosstalk reduction processing in the above multiple-property image signal processing section 48 is actually performed for each color channel constituting both image data of the wide-angle image 42 and the telescopic image 43. The multiple-property image signal processing section 48 stores "the inverse matrix $M^{-1}$ of the matrix M configured of the detected gain distribution and the crosstalk gain distribution" related to each color channel. For example, the case of the directional sensor 24 (the first pixel 25a and the second pixel 25b) having RGB (red, green, and blue) color filters and the directional sensor 24 outputting both image data of the wide-angle image 42 and the telescopic image 43 configured of RGB data as the imaging signal will be illustratively described. In this case, the multiple-property image signal processing section 48 retains and applies "the inverse matrix $M^{-1}$ of the matrix M configured of the detected gain distribution and the crosstalk gain distribution" related to each color channel of RGB to the output wide-angle image Iw2 and the output telescopic image It2.

Figure 19B:
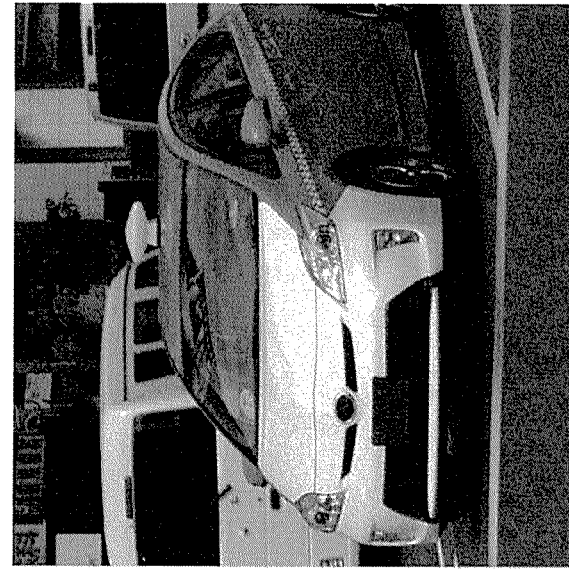
FIGS. 19A and 19B are diagrams illustrating image examples of a wide-angle image and a telescopic image that are acquired in the case of a multiple-property image signal processing section performing crosstalk reduction processing.
Figure 19A:
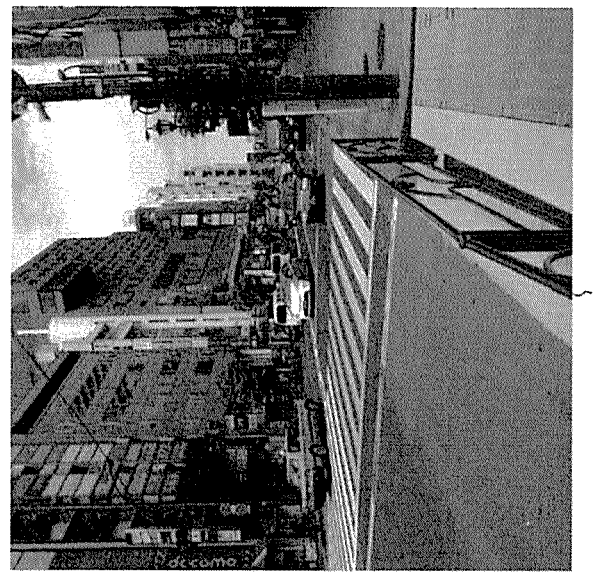

FIGS. 19A and 19B are diagrams illustrating image examples of the wide-angle image 42 (refer to FIG. 19A) and the telescopic image 43 (refer to FIG. 19B) that are acquired in the case of performing the crosstalk reduction processing in the multiple-property image signal processing section 48. As illustrated in FIGS. 19A and 19B, influence of "a telescopic image component mixed into the wide-angle image 42" or influence of "a wide-angle image component mixed into the telescopic image 43" can be reduced in the wide-angle image 42 and the telescopic image 43 after the correction processing (crosstalk reduction processing) compared with the state before the correction processing (refer to FIGS. 11A and 11B). Consequently, the wide-angle image 42 and the telescopic image 43 of high image quality that have excellent visibility as a whole are acquired.

The multiple-property image signal processing section 48 outputs, to the typical image processing unit 35, the image data of the wide-angle image 42 and the telescopic image 43 for which the crosstalk reduction processing is performed.

<Single Image Signal Processing (Sensitivity Correction)>

Returning to FIG. 3, the single image signal processing section 49 operates in the case of the determination result for the type of lens input from the lens type determining unit 32 being equal to the "typical lens 12". The single image signal processing section 49, for the image data of the single image 45, performs sensitivity correction (uniformization) processing of correcting a difference in sensitivity for each of the plurality of types of pixels (the first pixel 25a and the second pixel 25b) of the directional sensor 24.

Figure 20:
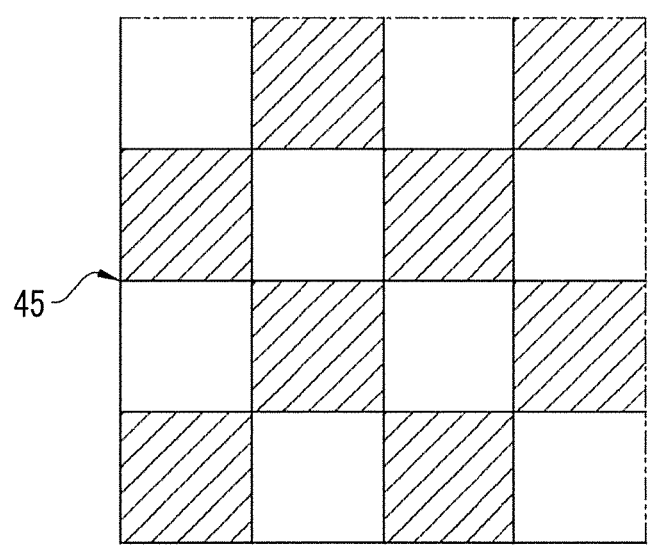
FIG. 20 is a descriptive diagram for describing a single image before sensitivity correction processing.

FIG. 20 is a descriptive diagram for describing the single image 45 before the sensitivity correction processing. In order to prevent description from being complicated, a solid image that has uniform density will be illustratively described as the single image 45. As described above, a difference in sensitivity occurs between the first pixel 25a and the second pixel 25b that are two-dimensionally alternately arranged in the directional sensor 24 (refer to FIG. 10). Consequently, as illustrated in FIG. 20, the pixel value (output value) of a first image pixel 45a corresponding to the first pixel 25a and the pixel value (output value) of a second image pixel 45b corresponding to the second pixel 25b are rendered non-uniform in the single image 45. Thus, the single image signal processing section 49, as the sensitivity correction (uniformization) processing, performs shading correction processing for the pixel value of each of the first image pixel 45a and the second image pixel 45b.

(a) to (c) of FIG. 21 are descriptive diagrams for describing the shading correction processing of the single image signal processing section 49. As illustrated in (a) of FIG. 21, the single image signal processing section 49, if receiving input of the image data of the single image 45 from the image generating unit 33, applies a shading correction coefficient to the pixel value of each of the first image pixel 45a and the second image pixel 45b as illustrated in (b) of FIG. 21. The positions of the first pixel 25a and the second pixel 25b of the directional sensor 24 are previously known. Thus, the positions of the first image pixel 45a and the second image pixel 45b in the single image 45 are also previously known.

The shading correction coefficient includes a first shading correction coefficient K1 for correcting the pixel value of the first image pixel 45a and a second shading correction coefficient K2 for correcting the pixel value of the second image pixel 45b. The first shading correction coefficient K1 and the second shading correction coefficient K2 are stored in advance in an internal memory or the like, not illustrated, of the single image signal processing section 49. For example, in the case of the sensitivity of the first pixel 25a of the directional sensor 24 being higher than the sensitivity of the second pixel 25b, the first shading correction coefficient K1 is set to a value that decreases the pixel value of the first image pixel 45a, and the second shading correction coefficient K2 is set to a value that increases the pixel value of the second image pixel 45b.

The single image signal processing section 49 executes the shading correction processing by applying the first shading correction coefficient K1 to the pixel value of the first image pixel 45a and applying the second shading correction coefficient K2 to the pixel value of the second image pixel 45b in the single image 45. Accordingly, as illustrated in (c) of FIG. 21, the pixel value of the first image pixel 45a and the pixel value of the second image pixel 45b are rendered uniform in the single image 45, and a difference in sensitivity is corrected for each of the plurality of types of pixels of the directional sensor 24.

The first shading correction coefficient K1 and the second shading correction coefficient K2 are determined by the typical lens 12 and the directional sensor 24 used in imaging. While the shading correction coefficient is applied to both of the pixel value of the first image pixel 45a and the pixel value of the second image pixel 45b in the present embodiment, the shading correction coefficient may be applied to only one thereof.

The single image signal processing section 49 outputs the image data of the single image 45 after the shading correction processing to the typical image processing unit 35.

<Another Configuration of Imaging Device>

Returning to FIG. 3, the typical image processing unit 35, in the case of the multiple-property lens 11 being attached to the lens attaching portion 3, performs various types of image processing such as offset processing, white balance correction processing, and gamma correction processing for the image data of the multiple-property image 41 (the wide-angle image 42 and the telescopic image 43) input from the multiple-property image signal processing section 48. In addition, the typical image processing unit 35, in the case of the typical lens 12 being attached to the lens attaching portion 3, performs the same various types of image processing for the image data of the single image 45 input from the single image signal processing section 49. The typical image processing unit 35 outputs the image data of the multiple-property image 41 or the image data of the single image 45 after image processing to a memory (includes a video memory) not illustrated.

The display unit 7 reads out, from the video memory, the image data for which image processing is performed in the typical image processing unit 35, and displays an image (the multiple-property image 41 or the single image 45) on a display screen on the basis of the image data. At this point, the display unit 7, on the basis of the determination result for the type of lens input from the lens type determining unit 32, displays the multiple-property image 41 or the single image 45 in a display format that is determined in advance for each type of lens.

FIG. 22A is a descriptive diagram for describing a display format of an image displayed on the display unit 7 in the case of the multiple-property lens 11 being attached to the lens attaching portion 3. FIG. 22B is a descriptive diagram for describing a display format of an image displayed on the display unit 7 in the case of the typical lens 12 being attached to the lens attaching portion 3.

As illustrated in FIG. 22A, the display unit 7, in the case of the determination result for the type of lens input from the lens type determining unit 32 being equal to the "multiple-property lens 11", linearly displays, for example, the wide-angle image 42 and the telescopic image 43 in a form of parallel display on the display screen on the basis of the image data of the multiple-property image 41 read out from the video memory.

As illustrated in FIG. 22B, the display unit 7, in the case of the determination result for the type of lens input from the lens type determining unit 32 being equal to the "typical lens 12", displays, for example, the single image 45 in a form of full display on the display screen on the basis of the image data of the single image 45 read out from the video memory.

The display format that is determined for each type of lens is not particularly limited to the forms of display illustrated in FIGS. 22A and 22B and is not particularly limited provided that the display format can display each of the multiple-property image 41 and the single image 45.

Returning to FIG. 3, when the shutter button 5 is pushed, the recording unit 36 reads out, from the video memory, the image data for which image processing is performed in the typical image processing unit 35, and records the image data in the memory card 14 in a recording format (includes a format of compression) that is determined in advance for each type of lens.

The recording unit 36, in the case of the determination result for the type of lens input from the lens type determining unit 32 being equal to the "multiple-property lens 11", records the image data of the multiple-property image 41 (the wide-angle image 42 and the telescopic image 43) read out from the memory in the memory card 14 in a form of, for example, multi picture (MP) format. The recording format of the image data of the multiple-property image 41 is not limited to the form of MP format. Various forms of recording that can record a plurality of files may be employed.

The recording unit 36, in the case of the determination result for the type of lens input from the lens type determining unit 32 being equal to the "typical lens 12", records the image data of the single image 45 read out from the memory in the memory card 14 in a known recording format such as a form of Joint Photographic Experts Group (JPEG) or a form of tagged image file format (TIFF).

When a transfer starting operation for image data is performed in the operating unit 8, the transferring unit 37 reads out, from the memory card 14 or the like, the image data for which image processing is performed in the typical image processing unit 35, and transfers the image data to, for example, a receiving unit 56 of a printer 55. For example, a wired or wireless communication interface or an optical communication interface can be used as the transferring unit 37. The transfer destination of the image data may be various electronic apparatuses other than the printer 55, a server on a network, or the like and is not particularly limited.

The transferring unit 37, in the case of the determination result for the type of lens input from the lens type determining unit 32 being equal to the "multiple-property lens 11", transfers the image data of the multiple-property image 41 (the wide-angle image 42 and the telescopic image 43) read out from the memory card 14 to the receiving unit 56 in a form of transfer suitable for transfer of a plurality of files.

The transferring unit 37, in the case of the determination result for the type of lens input from the lens type determining unit 32 being equal to the "typical lens 12", transfers the image data of the single image 45 read out from the memory card 14 to the receiving unit 56 in a form of transfer suitable for transfer of one file.

Action of Imaging Device of First Embodiment

Next, the action of the imaging device 2 having the above configuration will be described by using FIG. 23. FIG. 23 is a flowchart illustrating the flow of imaging processing of the imaging device 2 (a control method for the imaging device of the present invention).

A user selects one lens from the multiple-property lens 11 and the typical lens 12 in accordance with the purpose of imaging and attaches the selected lens to the lens attaching portion 3 before turning the power switch of the imaging device 2 ON (Step S1). After the lens is attached, each unit of the imaging device 2 operates if the user turns the power switch of the imaging device 2 ON.

Initially, a determination as to whether the type of lens attached to the lens attaching portion 3 is the multiple-property lens 11 or the typical lens 12 is performed by the lens type determining unit 32 reading out information stored in the lens through the lens attaching portion 3 or detecting the position of the engaging claw of the lens (Step S2; corresponds to a determination step of the present invention). In the case of the user inputting the type of lens into the lens type input unit 15, the lens type determining unit 32 determines the type of lens on the basis of the input result.

<In Case of Attaching Multiple-Property Lens>

In the case of the multiple-property lens 11 being attached to the lens attaching portion 3 (YES in Step S3), the lens type determining unit 32 provides, to each of the image generating unit 33, the digital signal processing section 34, the display unit 7, the recording unit 36, and the transferring unit 37, an output that indicates that the determination result for the type of lens is equal to the "multiple-property lens 11".

Next, imaging with the directional sensor 24 is started. The wide-angle image light W that passes the first optical system 21 of the multiple-property lens 11 is received by the first light receiving section 24a (first pixel 25a) of the directional sensor 24. At the same time, the telescopic image light T that passes the second optical system 22 of the multiple-property lens 11 is received by the second light receiving section 24b (second pixel 25b) of the directional sensor 24.

The image generating unit 33 receives the determination result of the lens type determining unit 32 for the type of lens ("multiple-property lens 11") and reads out an imaging signal in a reading format that reads out the imaging signal from each of the first pixel 25a of the first light receiving section 24a and the second pixel 25b of the second light receiving section 24b of the directional sensor 24 (Step S4). Next, the image generating unit 33 generates the image data of the wide-angle image 42 on the basis of the imaging signal read out from each first pixel 25a of the first light receiving section 24a and generates the image data of the telescopic image 43 on the basis of the imaging signal read out from each second pixel 25b of the second light receiving section 24b. Accordingly, the image data of the multiple-property image 41 that consists of the wide-angle image 42 and the telescopic image 43 is generated in the image generating unit 33 (Step S5; corresponds to an image generation step of the present invention). The image generating unit 33 outputs the image data of the multiple-property image 41 to the digital signal processing section 34.

The digital signal processing section 34 receives the determination result of the lens type determining unit 32 for the type of lens ("multiple-property lens 11") and operates the multiple-property image signal processing section 48. The multiple-property image signal processing section 48, on the basis of the calculation formulas represented by above FIG. 17 and FIG. 18, performs the crosstalk reduction processing for both image data of the wide-angle image 42 and the telescopic image 43 acquired from the image generating unit 33 (Step S6, corresponds to an image correction step of the present invention). Accordingly, influence of "a telescopic image component mixed into the wide-angle image 42" or influence of "a wide-angle image component mixed into the telescopic image 43" can be reduced. Consequently, the wide-angle image 42 and the telescopic image 43 of high image quality that have excellent visibility as a whole are acquired (refer to FIGS. 19A and 19B). The multiple-property image signal processing section 48 outputs the image data of the multiple-property image 41 (the wide-angle image 42 and the telescopic image 43) to the typical image processing unit 35.

The typical image processing unit 35 performs various types of image processing such as offset processing, white balance correction processing, and gamma correction processing for the image data of the multiple-property image 41 input from the multiple-property image signal processing section 48 and then outputs the image data after image processing to the memory (includes the video memory) (Step S7).

The display unit 7 receives the determination result of the lens type determining unit 32 for the type of lens ("multiple-property lens 11") and displays live view images of the wide-angle image 42 and the telescopic image 43 on the display screen in the form of parallel display on the basis of the image data of the multiple-property image 41 recorded in the video memory (Step S8; refer to FIG. 22A).

If the user performs a push operation on the shutter button 5 (imaging instruction operation), the processes of Step S4 to Step S7 are repeated, and then the recording unit 36 operates. The recording unit 36 receives the determination result of the lens type determining unit 32 for the type of lens ("multiple-property lens 11"), reads out the image data of the multiple-property image 41 after the image correction processing from the memory, and records the image data in the memory card 14 in the form of MP format (Step S9).

The transferring unit 37 operates if the user performs a transferring operation for the image data in the operating unit 8. The transferring unit 37 receives the determination result of the lens type determining unit 32 for the type of lens ("multiple-property lens 11") and transfers the image data of the multiple-property image 41 specified by the transferring operation to the receiving unit 56 of the printer 55 or the like in a form of transfer suitable for transfer of a plurality of files (Step S10).

Then, the above processes of Step S4 to Step S10 are repeated in the case of continuing imaging with use of the multiple-property lens 11 (YES in Step S11).

In the case of performing imaging with the typical lens 12, that is, in the case of interchanging lenses of the imaging device 2 (NO in Step S11 and YES in Step S12), the user temporarily turns the power supply of the imaging device 2 OFF and then detaches the multiple-property lens 11 from the lens attaching portion 3. Next, the user attaches the typical lens 12 to the lens attaching portion 3 (Step S1) and then turns the power supply of the imaging device 2 ON again.

<In Case of Attaching Typical Lens>

If the power switch of the imaging device 2 is ON, each unit of the imaging device 2 operates, and the lens type determining unit 32 determines the type of lens attached to the lens attaching portion 3 as described in above Step S2 (Step S2; corresponds to the determination step of the present invention). The lens type determining unit 32 provides, to each of the image generating unit 33, the digital signal processing section 34, the display unit 7, the recording unit 36, and the transferring unit 37, an output that indicates that the determination result for the type of lens is equal to the "typical lens 12" (NO in Step S3).

Next, the directional sensor 24 starts imaging. Typical light (luminous flux) that passes each position in the area of the typical lens 12 is received by each of the first light receiving section 24a (first pixel 25a) and the second light receiving section 24b (second pixel 25b) of the directional sensor 24.

The image generating unit 33 receives the determination result of the lens type determining unit 32 for the type of lens ("typical lens 12") and reads out an imaging signal in a reading format that reads out an imaging signal in order from all pixels 25 of the directional sensor 24 (Step S14). Next, the image generating unit 33 generates the image data of the single image 45 on the basis of the imaging signal read out from all pixels 25 of the directional sensor 24 (Step S15; corresponds to the image generation step of the present invention). Accordingly, image data that is based on the imaging signal from all pixels 25 of the directional sensor 24 (that is, image data having a larger number of pixels than each of the wide-angle image 42 and the telescopic image 43) is generated. The image generating unit 33 outputs the image data of the single image 45 to the digital signal processing section 34.

The digital signal processing section 34 receives the determination result of the lens type determining unit 32 for the type of lens ("typical lens 12") and operates the single image signal processing section 49. The single image signal processing section 49 executes the shading correction processing for the image data of the single image 45 acquired from the image generating unit 33 as described in above (a) and (b) of FIG. 21 (Step S16; corresponds to the image correction step of the present invention).

Specifically, the single image signal processing section 49 applies the first shading correction coefficient K1 to the pixel value of the first image pixel 45a and applies the second shading correction coefficient K2 to the pixel value of the second image pixel 45b in the single image 45. Accordingly, the pixel value of the first image pixel 45a and the pixel value of the second image pixel 45b are rendered uniform in the single image 45, and a difference in sensitivity is corrected for each of the plurality of types of pixels of the directional sensor 24 (refer to (c) of FIG. 21). The single image signal processing section 49 outputs the image data of the single image 45 after the shading correction processing to the typical image processing unit 35.

The typical image processing unit 35 performs various types of image processing such as offset processing, white balance correction processing, and gamma correction processing for the image data of the single image 45 input from the single image signal processing section 49 and then outputs the image data after image processing to the memory (includes the video memory) (Step S17).

The display unit 7 receives the determination result of the lens type determining unit 32 for the type of lens ("typical lens 12") and displays a live view image of the single image 45 in the display form of full display on the display screen on the basis of the image data of the single image 45 recorded in the video memory (Step S18; refer to FIG. 22B).

If the user performs a push operation on the shutter button 5 (imaging instruction operation), the processes of Step S14 to Step S17 are repeated, and then the recording unit 36 operates. The recording unit 36 receives the determination result of the lens type determining unit 32 for the type of lens ("typical lens 12"), reads out the image data of the single image 45 after the image correction processing from the memory, and records the image data in the memory card 14 in the form of JPEG or the like (Step S19).

The transferring unit 37 operates if the user performs a transferring operation for the image data in the operating unit 8. Since the determination result for the type of lens input from the lens type determining unit 32 is equal to the "typical lens 12", the transferring unit 37 transfers the image data of the single image 45 specified by the transferring operation to the receiving unit 56 of the printer 55 or the like in a form of transfer suitable for transfer of one file (Step S20).

Then, the above processes of Step S14 to Step S20 are repeated in the case of continuing imaging with use of the typical lens 12 (YES in Step S21).

After the end of imaging with use of the typical lens 12, in the case of interchanging lenses again, that is, in the case of performing imaging with the multiple-property lens 11 (NO in Step S21 and YES in Step S12), the above processes of Step S1 to Step S10 are repeated. In the case of not interchanging lenses (NO in Step S12), all processes are ended.

Effect of Present Embodiment

As described heretofore, the imaging device 2 of the present embodiment can determine the type of lens attached to the lens attaching portion 3 and switch the type of image correction processing (the crosstalk reduction processing and the sensitivity correction processing) performed for image data according to the determined type of lens (the multiple-property lens 11 and the typical lens 12). Thus, an image of favorable image quality is acquired with both of the multiple-property lens 11 and the typical lens 12 along with use of the directional sensor 24.

Imaging Device of Second Embodiment

FIG. 24 is a block diagram illustrating an electric configuration of an imaging device 2A of a second embodiment. While types of interchangeable lenses are total two types of the multiple-property lens 11 and the typical lens 12 in the imaging device 2 of the first embodiment, the types of interchangeable lenses are three or more types in the imaging device 2A.

The imaging device 2A is has basically the same configuration as the imaging device 2 of the first embodiment except that the types of interchangeable lenses is three or more types. Thus, the same functions and configurations as the first embodiment will be designated by the same reference signs and not be described.

At least three or more types of lenses including two or more types of multiple-property lenses (a first multiple-property lens 11A, a second multiple-property lens 11B, . . . ) and the typical lens 12 are selectively attached to the lens attaching portion 3 of the imaging device 2A. The first multiple-property lens 11A, the second multiple-property lens 11B, . . . have basically the same configuration as the multiple-property lens 11 of the first embodiment except for having different properties (focal length or the like) of the first optical system 21 and the second optical system 22 and thus will not be specifically described.

The image generating unit 33 of the second embodiment is basically the same as the image generating unit 33 of the first embodiment. The image generating unit 33 of the second embodiment, in the case of the first multiple-property lens 11A being attached to the lens attaching portion 3, outputs image data of a first multiple-property image 41A configured of the wide-angle image 42 and the telescopic image 43 to the digital signal processing section 34. Similarly, the image generating unit 33 of the second embodiment, in the case of the second multiple-property lens 11B, . . . being attached to the lens attaching portion 3, generates image data of a second multiple-property image 41B, . . . configured of the wide-angle image 42 and the telescopic image 43 and outputs the image data to the digital signal processing section 34.

The multiple-property image signal processing section 48 of the second embodiment is basically the same as the multiple-property image signal processing section 48 of the first embodiment. The above crosstalk reduction processing that corresponds to the type of multiple-property lens attached to the lens attaching portion 3 is performed for the image data of each of the multiple-property images 41A, 41B, . . . according to the determination result of the lens type determining unit 32 for the type of lens.

Specifically, as described above, the matrix M (refer to "A", "B", "C", and "D" in FIG. 15) that is based on the wide-angle detected gain distribution D1, the wide-angle crosstalk gain distribution D2, the telescopic crosstalk gain distribution D3, and the telescopic detected gain distribution D4 is determined by each of the multiple-property lenses 11A, 11B, . . . and the directional sensor 24 used in imaging. Thus, the multiple-property image signal processing section 48 of the second embodiment stores in advance elements of the inverse matrix $M^{-1}$ that respectively correspond to the multiple-property lenses 11A, 11B, . . . . Therefore, the multiple-property image signal processing section 48 of the second embodiment performs the crosstalk reduction processing corresponding to each of the multiple-property lenses 11A, 11B, . . . by calculating the product of the inverse matrix $M^{-1}$ corresponding to the type of multiple-property lens (each of the multiple-property lenses 11A, 11B, . . . ) attached to the lens attaching portion 3, the output wide-angle image Iw2, and the output telescopic image It2.

A display format in the display unit 7, a recording format in the recording unit 36, and a form of transfer in the transferring unit 37 of the image data of each of the multiple-property images 41A, 41B, . . . are basically the same as the display format, the recording format, and the form of transfer of the image data of the multiple-property image 41 in the first embodiment and thus will not be specifically described.

Accordingly, since the imaging device 2A of the second embodiment has basically the same configuration as the imaging device 2 of the first embodiment except that a plurality of types of multiple-property lenses (each of the multiple-property lenses 11A, 11B, . . . ) can be attached, the same effect as the first embodiment is achieved.

While the imaging device 2A to which a plurality of types of multiple-property lenses can be attached is illustratively described in the second embodiment, the present invention can also be applied to an imaging device to which a plurality of types of typical lenses can be attached. In this case, the first shading correction coefficient K1 and the second shading correction coefficient K2 are determined for each type of typical lens 12 and directional sensor 24. The single image signal processing section 49, according to the determination result of the lens type determining unit 32 for the type of lens, performs the shading correction by using the first shading correction coefficient K1 and the second shading correction coefficient K2 that correspond to the type of typical lens attached to the lens attaching portion 3. The present invention can also be applied to an imaging device to which a plurality of types of multiple-property lenses and a plurality of types of typical lenses can be attached.

Third Embodiment

While the imaging device 2 that includes the multiple-property lens 11 configured of the first optical system 21 and the second optical system 22 having different "focal lengths" is described in the above first embodiment, the present invention can also be applied to an imaging device that, as the plurality of areas of the present invention, includes a first optical system 21Y and a second optical system 22Y having different "properties" other than the focal length. One example of the imaging device that includes a multiple-property lens 11Y configured of the first optical system 21Y and the second optical system 22Y having different "focal distances" will be described in a third embodiment. The imaging device of the third embodiment has basically the same configuration as the imaging device 2 of the first embodiment except for including the multiple-property lens 11Y that is different from the first embodiment. Thus, the same functions and configurations as the first embodiment will be designated by the same reference signs and not be described.

FIG. 25 is an exterior view of the multiple-property lens 11Y of the imaging device of the third embodiment. As illustrated in FIG. 25, the multiple-property lens 11Y has a shape of a lens and has an area (hereinafter, referred to as a "far focal area") 60a having a relatively long focal distance and an area (hereinafter, referred to as a "near focal area") 60b having a shorter focal distance than the far focal area 60a. A first area (far focal area 60a) of a plurality of integrally disposed areas (the far focal area 60a and the near focal area 60b) of the multiple-property lens 11Y is configured of the first optical system 21Y, and a second area (near focal area 60b) thereof is configured of the second optical system 22Y. Therefore, each of the first optical system 21Y and the second optical system 22Y (the plurality of areas) of the multiple-property lens 11Y has an independent property (focal distance).

In the example illustrated in FIG. 25, if the multiple-property lens 11Y is viewed from the front, a half-moon shaped area that is on the lower side of a horizontal boundary including a lens center O1 is the far focal area 60a and corresponds to the first optical system 21Y, and a half-moon shaped area on the upper side thereof is the near focal area 60b and corresponds to the second optical system 22Y. The first optical system 21Y (far focal area 60a) and the second optical system 22Y (near focal area 60b), though having the same focal length in the present embodiment, may have different focal lengths. That is, the first optical system 21Y and the second optical system 22Y preferably have at least one of a focal length and a focal distance different from one another. Various property values of the first optical system 21Y and the second optical system 22Y may be the same or different, and a specific property value can be set according to the purpose of imaging, an imaging condition, and the like.

While the first optical system 21Y and the second optical system 22Y are formed in a half-moon shape in the example of FIG. 25, the shapes of the first optical system 21Y and the second optical system 22Y are not particularly limited. For example, the first optical system 21Y and the second optical system 22Y that form concentric circles may be used, or one of the first optical system 21Y and the second optical system 22Y may be formed in a circular area with the lens center O1 as a center, and the other may be formed in an annular area around the circular area. The surface area ratio and the volume ratio of the first optical system 21Y and the second optical system 22Y are not particularly limited.

With use of the multiple-property lens 11Y having such a configuration, the imaging device of the third embodiment can acquire two types of images having different focal distances at the same time.

FIG. 26 is an enlarged cross-sectional view illustrating a part of a directional sensor 24Y of the imaging device of the third embodiment. While each pixel of the directional sensor 24Y of the third embodiment has basically the same configuration as each pixel 25 of the directional sensor 24 of the above first embodiment, a light shielding mask 28Y of the third embodiment is arranged to cover half of the light receiving surface of the photodiode 29. That is, the light shielding mask 28Y of a first pixel 25Ya is arranged to cover one of two split light receiving surfaces of the photodiode 29. In addition, the light shielding mask 28Y of a second pixel 25Yb is arranged to cover the other of the two split light receiving surfaces of the photodiode 29. Pupil division is performed with an unnecessary luminous flux shielded by the light shielding mask 28Y having such arrangement. A luminous flux that passes the first optical system 21 is received by the first pixel 25Ya, and a luminous flux that passes the second optical system 22 is received by the second pixel 25Yb.

The ratio in numbers of the first pixels 25Ya and the second pixels 25Yb is preferably equal to the area ratio of the light receiving surfaces of the first optical system 21Y (far focal area 60a) and the second optical system 22Y (near focal area 60b). Therefore, in the case of the light receiving surfaces of the first optical system 21Y and the second optical system 22Y having equal areas, the number of first pixel 25Ya is preferably the same as the number of second pixels 25Yb. In addition, the first pixel 25Ya and the second pixel 25Yb are preferably arranged in such a manner that image quality is not degraded with respect to a specific area and a specific direction of a generated image. Mixing the first pixel 25Ya and the second pixel 25Yb can complement loss of pixel data due to interpolation processing or the like.

FIG. 27 is a diagram for describing an imaging mechanism that uses the multiple-property lens 11Y of the imaging device of the third embodiment.

In FIG. 27, contents indicated by each reference sign are as follows.

a1: lens—light receiving surface distance of first optical system 21Y (far focal area 60a)

a2: lens—light receiving surface distance of second optical system 22Y (near focal area 60b)

b1: lens—subject distance of first optical system 21Y (far focal area 60a)

b2: lens—subject distance of second optical system 22Y (near focal area 60b)

FD1: focal distance of first optical system 21Y (far focal area 60a)

FD2: focal distance of second optical system 22Y (near focal area 60b)

Q1A, Q1B, and Q2: subjects

The "focal distance" in the present embodiment indicates the distance from the light receiving surface of each of the pixels 25Ya and 25Yb of the directional sensor 24Y to a subject that is in a focused relationship with each of the pixels 25Ya and 25Yb. In the example illustrated in FIG. 27, the relationships "FD1=a1+b1" and "FD2=a2+b2" are established. In addition, given that the focal length of the first optical system 21Y (far focal area 60a) is "f1" and that the focal length of the second optical system 22Y (near focal area 60b) is "f2", the relationships "1/f1=(1/a1)+(1/b1)" and "1/f2=(1/a2)+(1/b2)" are established.

Even in such an imaging device of the third embodiment that includes "the first optical system 21Y and the second optical system 22Y having different focal distances", influence of interference of luminous fluxes between the first optical system 21 and the second optical system 22 can be reduced with the same functional configuration (refer to FIG. 3) as the first embodiment according to the actual status of imaging. In the case of interchanging lenses from the multiple-property lens 11Y to the typical lens 12, the shading correction processing is executed by the above single image signal processing section 49. Thus, a difference in sensitivity is corrected for each of the plurality of types of pixels (the first pixel 25Ya and the second pixel 25Yb) of the directional sensor 24Y in the same manner as the first embodiment. Therefore, the same effect as the first embodiment is achieved.

Others

While the imaging device performing still image capturing is illustratively described in each of the embodiments, the present invention can also be applied to an imaging device that performs motion picture imaging.

While the multiple-property lens is illustratively described as being configured of the first optical system and the second optical system having a different property (a focal length or a focal distance) in each of the embodiments, the multiple-property lens may be configured of three or more types of optical systems having a different property (a focal length or a focal distance). In this case, the directional sensor used has a plurality of types of pixels and selectively receives a luminous flux passing a corresponding optical system of the three or more types of optical systems by pupil division of the luminous flux. In addition, the multiple-property image signal processing section performs image correction processing (crosstalk reduction processing) for three or more types of image data (for example, a wide-angle image, a telescopic image (1), a telescopic image (2), . . . ) on the basis of the inverse matrix of the matrix configured of the detected gain distribution and the crosstalk gain distribution.

While the first optical system and the second optical system having a different "focal length" or "focal distance" is illustratively described as the first optical system and the second optical system of the multiple-property lens having a different "property" in each of the embodiments, the first optical system and the second optical system, for example, may have a different modulation transfer function (MTF) as a property while having the same "focal length" or "focal distance".

While the single image signal processing section 49 corrects a difference in sensitivity for each of the plurality of types of pixels of the directional sensor by shading correction in each of the embodiments, the method for correcting the difference in sensitivity is not limited to shading correction, and various known correction methods can be used.

Each configuration and each function above can be appropriately realized by any hardware, software, or a combination thereof. The present invention can be applied to, for example, a program that causes a computer to execute the above process steps (process procedures), a computer-readable recording medium (non-transitory recording medium) in which such a program is recorded, or a computer on which such a program can be installed.

An embodiment to which the present invention can be applied is not limited to a digital camera imaging device as illustrated in FIG. 1. The present invention can also be applied to a mobile apparatus type, in addition to a camera type performing imaging as a main function, that includes another function (a calling function, a communication function, or another computer function) other than imaging in addition to an imaging function. Another embodiment to which the present invention can be applied is exemplified by, for example, a mobile phone or a smartphone having a camera function, personal digital assistants (PDA), and a mobile game apparatus. Hereinafter, one example a smartphone to which the present invention can be applied will be described.

<Configuration of Smartphone>

FIG. 28 is a diagram illustrating the exterior of a smartphone 101 that is one embodiment of the imaging device of the present invention. The smartphone 101 illustrated in FIG. 28 has a plate-shaped casing 102. A display input unit 120 in which a display panel 121 as a display unit and an operating panel 122 as an input unit are integrally formed is disposed on one surface of the casing 102. In addition, the casing 102 includes a speaker 131, a microphone 132, an operating unit 140, and a camera unit 141. The configuration of the casing 102 is not limited thereto and, for example, can employ a configuration in which a display unit and an input unit are independently disposed or employ a configuration that has a folding structure or a sliding mechanism.

FIG. 29 is a block diagram illustrating a configuration of the smartphone 101 illustrated in FIG. 28. As illustrated in FIG. 29, a wireless communication unit 110, the display input unit 120, a calling unit 130, the operating unit 140, the camera unit 141, a storage unit 150, an external input and output unit 160, a global positioning system (GPS) receiving unit 170, a motion sensor unit 180, a power supply unit 190, and a main control unit 100 are included as main constituents of the smartphone 101. In addition, a wireless communication function that performs mobile wireless communication through a base station apparatus and a mobile communication network is included as a main function of the smartphone 101.

The wireless communication unit 110 performs wireless communication with the base station apparatus connected to the mobile communication network in accordance with an instruction from the main control unit 100. With use of the wireless communication, transmission and reception of various types of file data such as audio data and image data, electronic mail data, and the like and reception of Web data, streaming data, and the like are performed.

The display input unit 120 is a so-called touch panel including the display panel 121 and the operating panel 122 and, by control of the main control unit 100, visually delivers information to the user by displaying an image (a still image and a moving image), character information, or the like, and detects a user operation for the displayed information.

The display panel 121 uses a liquid crystal display (LCD), an organic light-emitting diode display (OLED), or the like as a display device. The operating panel 122 is a device that is disposed in a state where an image displayed on a display surface of the display panel 121 is visible and that detects one or a plurality of coordinates operated with a finger of the user or a stylus. If the device is operated with a finger of the user or the stylus, the operating panel 122 outputs a detected signal generated by the operation to the main control unit 100. Next, the main control unit 100 detects the position of the operation (coordinates) on the display panel 121 on the basis of the received detected signal.

The display panel 121 and the operating panel 122 of the smartphone 101 illustrated in FIG. 28 as one embodiment of the imaging device of the present invention integrally constitute the display input unit 120, and the operating panel 122 is arranged to completely cover the display panel 121. In the case of employing the arrangement, the operating panel 122 may include a function of detecting a user operation even in an area outside of the display panel 121. In other words, the operating panel 122 may include a detection area (hereinafter, referred to as a "display area")

for an overlaying part thereof that overlays the display panel 121 and a detection area (hereinafter referred to as a "non-display area") for a peripheral part thereof other than the overlaying part that does not overlay the display panel 121.

The size of the display area may completely match the size of the display panel 121, but both sizes may not necessarily match. In addition, the operating panel 122 may include two responsive areas of a peripheral part thereof and an inner part thereof other than the peripheral part. Furthermore, the width of the peripheral part is appropriately designed according to the size or the like of the casing 102. Furthermore, a position detection method employed in the operating panel 122 is exemplified by a matrix switch method, a resistive film method, a surface acoustic wave method, an infrared method, an electromagnetic induction method, an electrostatic capacitive method, or the like, and any method may be employed.

The calling unit 130 includes the speaker 131 and the microphone 132. The calling unit 130 converts the voice of the user input through the microphone 132 into audio data processable in the main control unit 100 and outputs the audio data to the main control unit 100, or decodes audio data received by the wireless communication unit 110 or the external input and output unit 160 and causes the decoded audio data to be output from the speaker 131. As illustrated in FIG. 28, for example, the speaker 131 can be mounted on the same surface as the surface on which the display input unit 120 is disposed, and the microphone 132 can be mounted on a side surface of the casing 102.

The operating unit 140 is a hardware key in which a key switch or the like is used, and receives an instruction from the user. For example, as illustrated in FIG. 28, the operating unit 140 is a push-button switch that is mounted on a side surface of the casing 102 of the smartphone 101, is placed into a switch ON state if being pushed with a finger or the like, and is placed into a switch OFF state by a restoring force of a spring or the like if the finger is separated.

The storage unit 150 stores a control program and control data of the main control unit 100, application software, address data in which a name, a telephone number, and the like of a communication party are associated, data of a transmitted or received electronic mail, Web data downloaded by Web browsing, downloaded contents data, and the like and temporarily stores streaming data and the like. In addition, the storage unit 150 is configured of a smartphone-incorporated internal storage unit 151 and an external storage unit 152 having a for detachable external memory. Each of the internal storage unit 151 and the external storage unit 152 constituting the storage unit 150 is realized by using a storage medium such as a memory of a flash memory type, a hard disk type, a multimedia card micro type, or a card type (for example, a MicroSD (registered trademark) memory), a random access memory (RAM), a read only memory (ROM), or the like.

The external input and output unit 160 acts as an interface with all external apparatuses connected to the smartphone 101 and is directly or indirectly connected to another external apparatus by communication or the like (for example, Universal Serial Bus (USB) or IEEE1394) or a network (for example, the Internet, a wireless local area network (LAN), Bluetooth (registered trademark), radio frequency identification (RFID), Infrared Data Association (IrDA) (registered trademark), Ultra Wide Band (UWB) (registered trademark), or ZigBee (registered trademark)).

Examples of the external apparatuses connected to the smartphone 101 include a wired/wireless headset, a wired/wireless external changer, a wired/wireless data port, a memory card or a subscriber identity module (SIM)/user identity module (UIM) card connected through a card socket, an external audio and video apparatus connected through an audio and video input/output (I/O) terminal, a wirelessly connected external audio and video apparatus, a smartphone connected in a wired/wireless manner, a personal computer connected in a wired/wireless manner, a PDA connected in a wired/wireless manner, and an earphone. The external input and output unit 160 may be configured to deliver data transferred from such an external apparatus to each constituent in the smartphone 101 or to transfer data in the smartphone 101 to an external apparatus.

The GPS receiving unit 170, in accordance with an instruction from the main control unit 100, receives a GPS signal transmitted from GPS satellites ST1, ST2, . . . , STn, executes position measurement calculation processing based on a plurality of received GPS signals, and detects a position specified by the latitude, the longitude, and the altitude of the smartphone 101. The GPS receiving unit 170, in the case of being capable of acquiring positional information from the wireless communication unit 110 and/or the external input and output unit 160 (for example, a wireless LAN), can detect the position by using the positional information.

The motion sensor unit 180 includes, for example, a three-axis acceleration sensor and detects a physical motion of the smartphone 101 in accordance with an instruction from the main control unit 100. Detection of a physical motion of the smartphone 101 allows the moving direction or the acceleration of the smartphone 101 to be detected. The result of the detection is output to the main control unit 100.

The power supply unit 190 supplies power stored in a battery (not illustrated) to each unit of the smartphone 101 in accordance with an instruction from the main control unit 100.

The main control unit 100 includes a microprocessor, operates in accordance with the control program and the control data stored in the storage unit 150, and generally controls each unit of the smartphone 101. In addition, the main control unit 100 includes a mobile communication control function of controlling each unit of a communication system and an application processing function in order to perform audio communication and data communication through the wireless communication unit 110.

The application processing function is realized by the main control unit 100 operating in accordance with the application software stored in the storage unit 150. Examples of the application processing function include an infrared communication function that performs data communication with a counterpart apparatus by controlling the external input and output unit 160, an electronic mailing function of transmitting or receiving an electronic mail, and a Web browsing function of browsing a Web page.

In addition, the main control unit 100 includes an image processing function such as displaying a video on the display input unit 120 on the basis of image data (data of a still image or a moving image) such as received data, downloaded streaming data, or the like. The image processing function refers to a function of the main control unit 100 that decodes the image data, performs image processing for the decoding result, and displays an image acquired through the image processing on the display input unit 120.

The main control unit 100 executes a display control for the display panel 121 and an operation detection control of detecting a user operation performed through the operating unit 140 or the operating panel 122.

The main control unit 100, by executing the display control, displays an icon for launching the application software or a software key such as a scroll bar or displays a window for writing an electronic mail. The scroll bar refers to a software key for receiving an instruction to move a displayed part of an image for a large image or the like that does not fit in the display area of the display panel 121.

The main control unit 100, by executing the operation detection control, detects a user operation performed through the operating unit 140, receives an operation performed for the icon or an input of a character string in an input field of the window through the operating panel 122, or receives a scroll request for a displayed image through the scroll bar.

Furthermore, the main control unit 100 includes a touch panel control function that, by execution of the operation detection control, determines whether the position of an operation performed for the operating panel 122 corresponds to the overlaying part (display area) overlaying the display panel 121 or corresponds to the peripheral part (non-display area) other than the overlaying part not overlaying the display panel 121 and that controls the displayed position of the responsive area of the operating panel 122 or the software key.

In addition, the main control unit 100 can detect a gesture operation performed for the operating panel 122 and execute a preset function in response to the detected gesture operation. The gesture operation is not a simple touch operation in the related art and means an operation of drawing a trajectory with a finger or the like, specifying a plurality of positions at the same time, or, as a combination thereof, drawing a trajectory from at least one of a plurality of positions.

The camera unit 141 is a digital camera that performs electronic imaging by using an imaging element such as a complementary metal oxide semiconductor image sensor (CMOS image sensor), and corresponds to the imaging device of the present invention. The camera unit 141, by control of the main control unit 100, can convert image data acquired by imaging into compressed image data such as JPEG and record the image data in the storage unit 150 or output the image data through the external input and output unit 160 or the wireless communication unit 110. As illustrated in FIG. 28, the camera unit 141 is mounted on the same surface (the surface of the casing 102) as the display input unit 120 and on the rear surface of the casing 102 in the smartphone 101.

The camera unit 141 mounted on the rear surface of the casing 102 has the directional sensor 24 described in each of the embodiments and furthermore allows interchange of lenses in the same manner as each of the embodiments. The camera unit 141 can determine the type of lens attached to the lens attaching portion and switch the type of image correction processing (the crosstalk reduction processing and the sensitivity correction processing) performed for image data according to the determined type of lens.

In addition, the camera unit 141 can be used in various functions of the smartphone 101. For example, an image acquired in the camera unit 141 may be displayed on the display panel 121, or an image that is captured and acquired in the camera unit 141 may be used as one of operation input methods for the operating panel 122. In addition, when the GPS receiving unit 170 detects a position, the position may be detected by referencing the image from the camera unit 141. Furthermore, determination of the direction of the optical axis of the camera unit 141 of the smartphone 101 or determination of the current usage environment can be performed by referencing the image from the camera unit 141 without using the three-axis acceleration sensor or with use of the three-axis acceleration sensor. Apparently, the image from the camera unit 141 can be used in the application software.

Besides, data that is acquired by adding positional information acquired by the GPS receiving unit 170, audio information acquired by the microphone 132 (may be converted into text information by audio text conversion by the main control unit or the like), attitude information acquired by the motion sensor unit 180, or the like to image data of a still picture or a motion picture can be recorded in the storage unit 150 or be output through the external input and output unit 160 or the wireless communication unit 110.

<Example of Application to Automatic Tracking Imaging Device>

The present invention can be applied to not only an imaging device that performs imaging in response to a user operation but also an interchangeable lens imaging device that automatically performs imaging.

FIG. 30 is a perspective view illustrating one example of an automatic tracking imaging device 214 (corresponds to the imaging device of the present invention) to which the present invention can be applied. In the automatic tracking imaging device 214 illustrated in FIG. 30, a holding unit 218 that includes a gear 219 and an imaging optical system 211 that is attached to the holding unit 218 are fixedly installed on a pedestal 216 that is disposed on a device main body 215. The pedestal 216 is disposed to be rotatable with the axis of a perpendicular direction Z of the device main body 215 as a center, and a pan operation with the axis of the perpendicular direction Z as a center is performed by a pan driving unit not illustrated. The gear 219 is disposed on the same axis as the axis of a horizontal direction X. A driving force is delivered from a tilt driving unit, not illustrated, through the gear 219 to pivot the imaging optical system 211 in the up-down direction, and thereby a tilt operation is performed. The imaging optical system 211, the holding unit 218 (gear 219), and the pedestal 216 are covered with a dustproof and rainproof dome cover 217.

The imaging optical system 211 allows selective attachment of the multiple-property lens and the typical lens described in each of the embodiments (allows interchange of lenses). The automatic tracking imaging device 214, in the same manner as the imaging device of each of the embodiments, can determine the type of lens attached to the holding unit 218 and switch the type of image correction processing (the crosstalk reduction processing and the sensitivity correction processing) performed for image data according to the determined type of lens. Consequently, the same effect as the effect described in each of the embodiments is achieved.

EXPLANATION OF REFERENCES

2: imaging device
3: lens attaching portion
7: display unit
11: multiple-property lens
12: typical lens
21: first optical system
22: second optical system
24: directional sensor
33: image generating unit
36: recording unit
37: transferring unit
41: multiple-property image
42: wide-angle image
43: telescopic image
45: single image 48: multiple-property image signal processing section
49: single image signal processing section
56: receiving unit

What is claimed is:

1. An imaging device comprising:
a lens attaching portion to which a plurality of types of lenses including a multiple-property lens having a plurality of areas with each of the plurality of areas having an independent property and a typical lens having one property is selectively attached;
a directional sensor that has a plurality of types of pixels configured of two-dimensionally arranged photoelectric conversion elements and, in a case of the multiple-property lens being attached to the lens attaching portion, selectively receives each luminous flux incident through the plurality of areas at the plurality of types of pixels by pupil division of the luminous flux;
a determining unit that determines the type of lens attached to the lens attaching portion;
an image generating unit that generates an image by reading out an imaging signal for each pixel from the directional sensor; and
an image correcting unit that corrects the image generated in the image generating unit,
wherein the image generating unit, on the basis of a determination result of the determining unit, in the case of the multiple-property lens being attached to the lens attaching portion, generates a plurality of images respectively corresponding to the plurality of areas from imaging signals of the directional sensor respectively corresponding to the plurality of areas and, in a case of the typical lens being attached to the lens attaching portion, generates one image from imaging signals of all pixels of the directional sensor, and
the image correcting unit, on the basis of the determination result of the determining unit, in the case of the multiple-property lens being attached to the lens attaching portion, performs correction of removing, from an image generated in correspondence with one area of the plurality of areas, influence of a luminous flux passing an area other than the one area and, in the case of the typical lens being attached to the lens attaching portion, corrects a difference in sensitivity for each pixel of the plurality of types of pixels.

2. The imaging device according to claim 1,
wherein the property is at least one of a focal length or a focal distance.

3. The imaging device according to claim 1,
wherein a plurality of types of the multiple-property lenses is selectively attached to the lens attaching portion.

4. The imaging device according to claim 2,
wherein a plurality of types of the multiple-property lenses is selectively attached to the lens attaching portion.

5. The imaging device according to claim 1,
wherein the image generating unit, on the basis of the determination result of the determining unit, reads out the imaging signal from the directional sensor in a reading format determined in advance for each type of lens.

6. The imaging device according to claim 2,
wherein the image generating unit, on the basis of the determination result of the determining unit, reads out the imaging signal from the directional sensor in a reading format determined in advance for each type of lens.

7. The imaging device according to claim 3,
wherein the image generating unit, on the basis of the determination result of the determining unit, reads out the imaging signal from the directional sensor in a reading format determined in advance for each type of lens.

8. The imaging device according to claim 1, further comprising:
a recording unit that, on the basis of the determination result of the determining unit, records the image corrected in the image correcting unit in a recording medium in a recording format determined in advance for each type of lens.

9. The imaging device according to claim 2, further comprising:
a recording unit that, on the basis of the determination result of the determining unit, records the image corrected in the image correcting unit in a recording medium in a recording format determined in advance for each type of lens.

10. The imaging device according to claim 3, further comprising:
a recording unit that, on the basis of the determination result of the determining unit, records the image corrected in the image correcting unit in a recording medium in a recording format determined in advance for each type of lens.

11. The imaging device according to claim 1, further comprising:
a display unit that, on the basis of the determination result of the determining unit, displays the image corrected in the image correcting unit in a display format determined in advance for each type of lens.

12. The imaging device according to claim 2, further comprising:
a display unit that, on the basis of the determination result of the determining unit, displays the image corrected in the image correcting unit in a display format determined in advance for each type of lens.

13. The imaging device according to claim 3, further comprising:
a display unit that, on the basis of the determination result of the determining unit, displays the image corrected in the image correcting unit in a display format determined in advance for each type of lens.

14. The imaging device according to claim 1, further comprising:
a transferring unit that transfers the image corrected in the image correcting unit to a receiving unit receiving the image and, on the basis of the determination result of the determining unit, transfers the image to the receiving unit in a transfer form determined in advance for each type of lens.

15. The imaging device according to claim 2, further comprising:
a transferring unit that transfers the image corrected in the image correcting unit to a receiving unit receiving the image and, on the basis of the determination result of the determining unit, transfers the image to the receiving unit in a transfer form determined in advance for each type of lens.

16. The imaging device according to claim 3, further comprising:
a transferring unit that transfers the image corrected in the image correcting unit to a receiving unit receiving the image and, on the basis of the determination result of the determining unit, transfers the image to the receiving unit in a transfer form determined in advance for each type of lens.

17. The imaging device according to claim 1, wherein the plurality of areas has a first area, and a second area that is disposed around the first area and has the same optical axis as the first area.

18. The imaging device according to claim 2, wherein the plurality of areas has a first area, and a second area that is disposed around the first area and has the same optical axis as the first area.

19. The imaging device according to claim 1, further comprising:
an input unit that receives an input of the type of lens attached to the lens attaching portion,
wherein the determining unit determines the type of lens attached to the lens attaching portion on the basis of an input result to the input unit.

20. A control method for an imaging device including a lens attaching portion to which a plurality of types of lenses is selectively attached and including a directional sensor having a plurality of types of pixel configured of two-dimensionally arranged photoelectric conversion elements, the imaging device including a multiple-property lens having a plurality of areas with each of the plurality of areas having an independent property and a typical lens having one property as the plurality of types of lenses and, in a case of the multiple-property lens being attached to the lens attaching portion, selectively receiving, with the directional sensor, each luminous flux incident through the plurality of areas at the plurality of types of pixels by pupil division of the luminous flux, the method comprising:
a determination step of determining the type of lens attached to the lens attaching portion;
an image generation step of generating an image by reading out an imaging signal for each pixel from the directional sensor; and
an image correction step of correcting the image generated in the image generation step,
wherein the image generation step, on the basis of a determination result of the determination step, in the case of the multiple-property lens being attached to the lens attaching portion, generates a plurality of images respectively corresponding to the plurality of areas from imaging signals of the directional sensor respectively corresponding to the plurality of areas and, in a case of the typical lens being attached to the lens attaching portion, generates one image from imaging signals of all pixels of the directional sensor, and
the image correction step, on the basis of the determination result of the determination step, in the case of the multiple-property lens being attached to the lens attaching portion, performs correction of removing, from an image generated in correspondence with one area of the plurality of areas, influence of a luminous flux passing an area other than the one area and, in the case of the typical lens being attached to the lens attaching portion, corrects a difference in sensitivity for each pixel of the plurality of types of pixels.

* * * * *